US012138539B2

(12) United States Patent
Garriss et al.

(10) Patent No.: US 12,138,539 B2
(45) Date of Patent: Nov. 12, 2024

(54) INTERACTIONS BETWEEN CHARACTERS IN VIDEO GAMES

(71) Applicant: SQUARE ENIX LTD., London (GB)

(72) Inventors: Zak Garriss, Westminster, CO (US); Mark Lyons, Westminster, CO (US); Jonathan Zimmerman, Westminster, CO (US); Andy Weatherl, Westminster, CO (US); Todd Bolinger, Westminster, CO (US); Zachary Shore, Westminster, CO (US); Philip Lawrence, London (GB)

(73) Assignee: SQUARE ENIX LTD., London (GB)

( * ) Notice: Subject to any disclaimer, the term of this patent is extended or adjusted under 35 U.S.C. 154(b) by 233 days.

(21) Appl. No.: 17/772,438

(22) PCT Filed: Mar. 30, 2020

(86) PCT No.: PCT/GB2020/050845
§ 371 (c)(1),
(2) Date: Apr. 27, 2022

(87) PCT Pub. No.: WO2021/198628
PCT Pub. Date: Oct. 7, 2021

(65) Prior Publication Data
US 2022/0379216 A1 Dec. 1, 2022

(51) Int. Cl.
*A63F 13/5372* (2014.01)
*A63F 13/5375* (2014.01)
(Continued)

(52) U.S. Cl.
CPC ...... *A63F 13/5372* (2014.09); *A63F 13/5375* (2014.09); *A63F 13/54* (2014.09); *A63F 13/58* (2014.09)

(58) Field of Classification Search
CPC .. A63F 13/5372; A63F 13/5375; A63F 13/54; A63F 13/58
(Continued)

(56) References Cited

U.S. PATENT DOCUMENTS 6,409,604 B1   6/2002  Matsuno
7,452,268 B2*  11/2008 Annunziata ............ A63F 13/45
                                                          463/1
(Continued)

FOREIGN PATENT DOCUMENTS

JP   H 07-194847 A   8/1995
JP    H7-194847 A    8/1995
(Continued)

OTHER PUBLICATIONS

PCT International Search Report and Written Opinion, PCT Application No. PCT/GB2020/050845, Oct. 9, 2020, 13 pages.

*Primary Examiner* — Allen Chan
(74) *Attorney, Agent, or Firm* — WTA Patents

(57) ABSTRACT

A computer-readable recording medium including a program which is executed by a computer apparatus to provide a video game comprising a virtual game world presented to a player of the video game, and a plurality of characters in the virtual game world including a first character, and a second character controlled by the player, the program causing the computer apparatus to function as: a state indicator generating unit configured to generate a state indication, wherein the state indication is an indication of an emotional or physical state of the first character; and a coupling indicator generating unit configured to generate a coupling indication, wherein the coupling indication is an indication of a coupling occurring between the emotional or physical state of the first character and an emotional or physical state of the second character.

6 Claims, 23 Drawing Sheets

(51) Int. Cl.
*A63F 13/54* (2014.01)
*A63F 13/58* (2014.01)

(58) Field of Classification Search
USPC .......................................................... 463/31
See application file for complete search history.

(56) References Cited

U.S. PATENT DOCUMENTS

| | | |
|---|---|---|
| 2004/0038739 A1 | 2/2004 | Wanat |
| 2006/0094500 A1* | 5/2006 | Dyke ..................... A63F 13/52 463/30 |
| 2006/0116186 A1 | 6/2006 | Sawada et al. |
| 2007/0218993 A1* | 9/2007 | Miyamoto ............... H04S 7/30 463/35 |
| 2014/0066200 A1 | 3/2014 | Matsui et al. |
| 2018/0280804 A1 | 10/2018 | Minagawa et al. |

FOREIGN PATENT DOCUMENTS

| | | |
|---|---|---|
| JP | 2000-107457 A | 4/2000 |
| JP | 2004-141435 A | 5/2004 |
| JP | 2004-187927 A | 7/2004 |
| JP | 2005-536257 A | 12/2005 |
| JP | 2014-023637 A | 2/2014 |
| JP | 2014-045966 A | 3/2014 |
| JP | 2017-217352 A | 12/2017 |
| JP | 2018-086085 A | 6/2018 |

\* cited by examiner

| Emotion coupling indicator lookup table ||| 
|---|---|---|
| Distance threshold | Indication type | Indication intensity |
| D1 | 1 (glow, no audio) | 1 |
| D2 | 1 (glow, no audio) | 2 |
| D3 | 1 (glow, no audio) | 3 |
| D4 | 2 (glow, with audio) | 1 |
| D5 | 2 (glow, with audio) | 2 |

FIG. 18

INTERACTIONS BETWEEN CHARACTERS IN VIDEO GAMES

FIELD OF THE INVENTION

The present invention relates to video games, and more particularly to a mechanism for enhancing interactions between characters within a virtual game world of a video game.

BACKGROUND TO THE INVENTION

In many video games, such as single player role-playing games or massively multiplayer online role-playing games, a player may control a so-called "player character" within a virtual game world to progress through the game. For example, a game may provide an entirely fictional world and the player may cause the player character to interact with various other characters and objects in the game world, using various game mechanics, to progress through a story. It should be noted that the term "player" as used herein may be used interchangeably with the term "user", and the two terms should be treated as synonymous.

In such story-driven games, it is common for the player character to encounter various other "non-player" characters (controlled by the video game program itself) and to interact with these characters as a means of advancing the game, or as a means of providing narrative exposition. For example, the player may interact with a non-player character to set the player character a quest, to provide the player with a hint on how to complete an objective, or to learn more about an aspect of the story.

However, the options available to the player for interacting with and influencing other characters in the virtual game world are often restricted to selecting one of a number of dialogue options, or to other simple and limited mechanics such as the completion or failure of a related quest. This may result in the player feeling a lack of immersion in the video game.

Accordingly, there is a desire to provide a greater range of available interactions between a player character and other characters in a game world, and thereby provide a more satisfying and enjoyable experience for the player. Likewise, there is also a desire to expand the range of mechanisms available to a game designer for conveying information to the user, e.g. to guide the user through the story/virtual game world.

Moreover, it can also be difficult for a player to gauge the emotional state of a character in the virtual game world based on the limited information typically provided by a game. For example, a player may have to rely on facial expressions which can easily be misinterpreted, especially if the game is run at a relatively low resolution, has an abstract art style, or if the character in question is non-human (e.g. an animal or fictional being). Alternatively, a player may rely on voice acting to indicate the emotional state of a non-player character. This may result in particular difficulties for users who have difficulty hearing, since nuances in the delivery of lines of dialogue by the voice actor may not be accurately reproduced by subtitles. As a result, interactions between the player character and the non-player character may become confusing and frustrating, since the non-player character may not react to the player's decisions and actions in the way the player expects. Therefore, there is a desire for the emotions of characters in the game world to be more clearly communicated to the player.

SUMMARY OF THE INVENTION

According to a first aspect of the invention there is provided a computer-readable recording medium including a program which is executed by a computer apparatus to provide a video game comprising a virtual game world presented to a player of the video game, and a plurality of characters in the virtual game world including a first character, and a second character controlled by the player, the program causing the computer apparatus to function as: a state indicator generating unit configured to generate a state indication, wherein the state indication is an indication of an emotional or physical state of the first character; and a coupling indicator generating unit configured to generate a coupling indication, wherein the coupling indication is an indication of a coupling occurring between the emotional or physical state of the first character and an emotional or physical state of the second character.

The state indicator generating unit, configured to generate a state indication as outlined above, may advantageously be used to give the player a deeper understanding of the emotional or physical state of the first character, resulting in more insightful and satisfying interactions between in-game characters. This may also provide a greater range of mechanisms by which a game designer can convey information to the user, to provide a more engaging experience for the player.

Furthermore, the mechanism of coupling occurring between the emotional or physical state of the first character and the emotional or physical state of the second character, as indicated by the coupling indicator generating unit, may be used to provide more immersive interactions between characters within the game.

In certain embodiments the emotional or physical state of the first character is coupled to the emotional or physical state of the second character when the second character is closer than a first predetermined threshold distance in the virtual game world from the first character.

Moreover, the state indicator generating unit may be configured to generate the state indication when the second character is closer than a second predetermined threshold distance in the virtual game world from the first character.

In certain embodiments the coupling indicator generating unit may be configured to generate a graphical indication of the first predetermined threshold distance in the virtual game world, and/or the state indicator generating unit may be configured to generate a graphical indication of the second predetermined threshold distance in the virtual game world. Providing such graphical indication(s) advantageously enables the user to understand how movement of the second character (player character) towards the first character in the game world will result in coupling taking place between the two characters.

Preferably at least one of the state indication or the coupling indication comprises a graphical indication.

Particularly preferably the state indication comprises a graphical indication that at least partially surrounds the first character.

For example, in a presently-preferred embodiment the state indication may comprise a visible aura that at least partially surrounds the first character. Such an indication provides a visually eye-catching indication of the emotional or physical state of the first character.

Optionally the visible aura may increase in size or intensity as the distance between the first character and the second character decreases.

Likewise, the coupling indication may comprise a graphical indication at least partially surrounding the first character, and a corresponding graphical indication at least partially surrounding the second character.

For example, the coupling indication may comprise a visible aura at least partially surrounding the first character and a corresponding visible aura at least partially surrounding the second character.

Optionally, one or both of the visible auras may increase in size or intensity as the distance between the first character and the second character decreases.

In any of the above situations in which at least one of the state indication or the coupling indication comprises a graphical indication, the state indication or the coupling indication may comprise an alteration of a colour or brightness.

Alternatively, or in addition, the state indication or the coupling indication may comprise a sound. The sound may increase in volume as the distance between the first character and the second character decreases.

Optionally the program may further cause the computer apparatus to function as a user interaction indication generating unit configured to generate an indication that the player may provide user input to initiate coupling of the emotional or physical state of the first character to the emotional or physical state of the second character. For example, the indication that the player may provide user input may comprise at least one of a button prompt or a sound.

In certain embodiments the program may further cause the computer apparatus to function as a perception indication unit configured to generate an indication of an entity perceived by the first character, based on the emotional or physical state of the first character. This may advantageously provide the user with greater insight as to what is causing the first character to be emotionally affected within the context of the game. The entity that is causing the first character to be emotionally affected may be an imaginary entity in the mind of the first character, that the first character perceives to be 'real' but which is not real to other characters in the game world. Alternatively the entity that is causing the first character to be emotionally affected may be a 'real' object within the game world.

Optionally the perception indication unit may be configured to generate an indication that the player may interact with the entity in the virtual game world perceived visually by the first character.

Moreover, the perception indication unit may be configured to modify the virtual game world presented to the player to include the entity perceived by the first character. This is particularly applicable to situations in which the entity perceived by the first character is imaginary, i.e. which exists only in the mind of the first character. However, this may also be beneficial if the entity is a 'real' object within the game world that is initially not visible to the player, e.g. due to being hidden or obscured by another object, but which is then revealed to the player by operation of the perception indication unit.

The entity perceived by the first character may be an entity in the virtual game world perceived visually by the first character.

In the present disclosure, the emotional state of the first character may comprise at least one of anger, sadness, happiness, joy, fear, anxiety, surprise, love, remorse, guilt, paranoia or disgust. This list is not exhaustive, and it will be appreciated that the principles described herein may be applied to other emotional states.

Furthermore, in the present disclosure, the physical state of the first character may comprise at least one of pain, temperature, drunkenness, visual impairment, cognitive impairment, mobility impairment or deafness. Again, this list is not exhaustive, and it will be appreciated that the principles described herein may be applied to other physical states.

In certain embodiments, when the physical state of the second character is coupled to the physical state of the first character, the second character experiences the physical state of the first character.

For example, the physical state of the first character may affect the control by the player of the movement of the second character. Alternatively, or in addition, the physical state of the first character may affect the presentation of the virtual game world to the player.

In presently-preferred embodiments the first character is a non-player character. However, in alternative embodiments the first character may be a character controlled by another player.

In certain embodiments, when the emotional or physical state of the first character is coupled to the emotional or physical state of the second character, the player is able to interact to modify the emotional or physical state of the first character, or the emotional or physical state of the second character.

For example, the program may be configured to present a minigame within the video game to the player, wherein by interacting with the minigame, the player is able to modify the emotional or physical state of the first character, or the emotional or physical state of the second character. This may provide a particularly engaging way for the user to influence the emotional or physical state of the first character.

BRIEF DESCRIPTION OF THE DRAWINGS

Embodiments of the invention will now be described by way of example only with reference to the attached figures in which:

FIG. 18 is an illustrative example of an indication lookup table, to which the routines of certain embodiments may refer;

DETAILED DESCRIPTION OF PREFERRED EMBODIMENTS

The present embodiments represent the best ways known to the Applicant of putting the invention into practice. However, they are not the only ways in which this can be achieved.

Embodiments of the present invention provide an emotional or physical state coupling routine that is incorporated within a video game. The video game is provided as a computer program. The computer program may be supplied on a computer-readable medium (e.g. a non-transitory computer-readable recording medium such as a CD or DVD) having computer-readable instructions thereon.

Alternatively, the computer program may be provided in a downloadable format, over a network such as the Internet, or may be hosted on a server.

Figure 1:
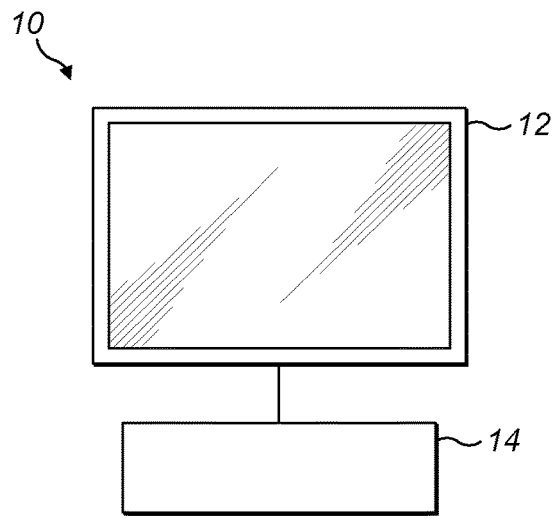
FIG. 1 schematically illustrates a video game apparatus (for example a personal computer or a video game console) on which a video game which incorporates an embodiment of the present invention may be played.

With reference to FIG. 1, the video game program may be executed on a video game apparatus 10, such as a personal computer or a video game console. The video game apparatus 10 comprises a display screen 12 on which the video game is displayed, and a control unit 14 which typically includes at least a Central Processing Unit (CPU), a Read Only Memory (ROM) and a Random Access Memory (RAM). The control unit 14 may also include a Graphics Processing Unit (GPU) and a sound processing unit. The display screen 12 and the control unit 14 may be provided in a common housing, or may be separate connected units. The video game apparatus 10 also includes one or more user input devices by which the user can control a player character in the game. Such a user input device may comprise, for example, a mouse, a keyboard, a hand-held controller (e.g. incorporating a joystick and/or various control buttons), or a touchscreen interface integral with the display screen 12 (e.g. as in the case of a smartphone or a tablet computer). The video game apparatus 10 may be connected to a network such as the Internet, or may be stand-alone apparatus that is not connected to a network.

Figure 2:
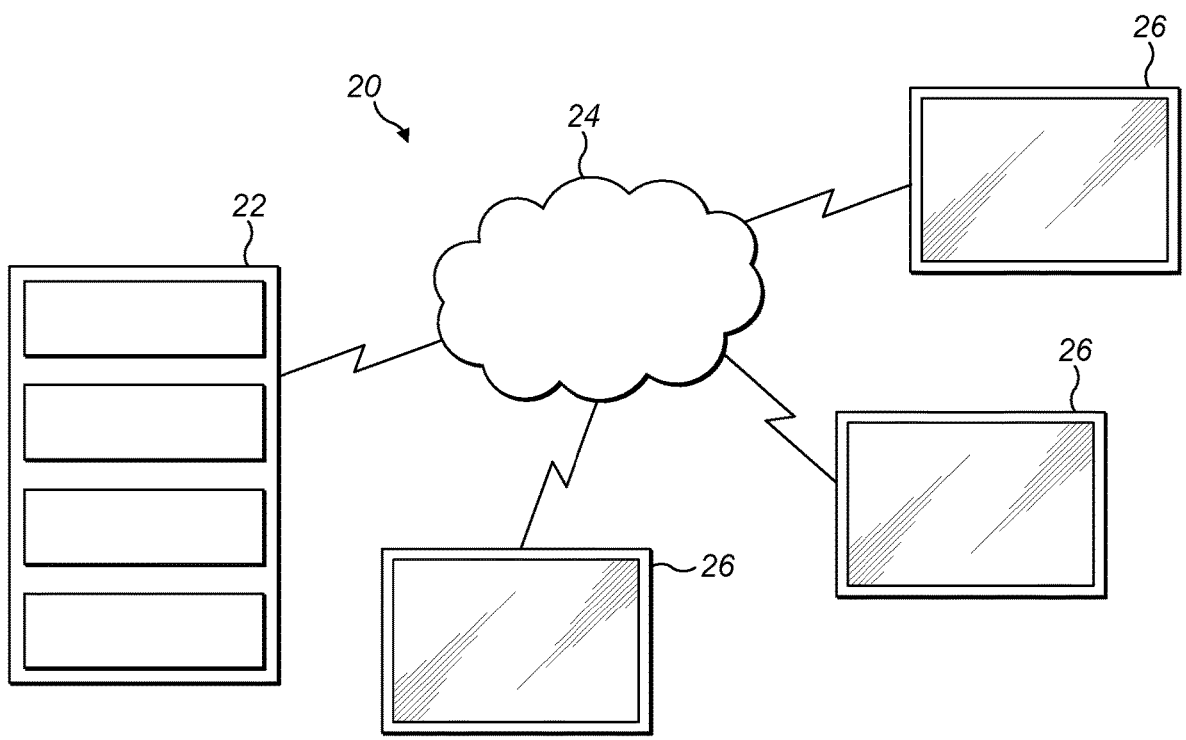
FIG. 2 schematically illustrates a network-based video game system comprising a server and a plurality of client terminals, on which terminals a video game which incorporates an embodiment of the present invention may be played.

Alternatively, with reference to FIG. 2, the video game program may be executed within a network-based video game system 20. The video game system 20 comprises a server device 22, a communication network 24 (e.g. the Internet), and a plurality of user terminals 26 operated by respective users. The server device 22 communicates with the user terminals 26 through the communication network 24. Each user terminal 26 may comprise a network-connectable video game apparatus 10 as described above, such as a personal computer or a video game console, or a smartphone, a tablet computer, or some other suitable piece of user equipment. The video game program may be executed on the server 22, which may stream user-specific game content (e.g. video in real time) to each of the plurality of user terminals 26. At each user terminal the respective user can interact with the game and provide input that is transmitted to the server 22, to control the progress of the game for the user. Alternatively, for a given user, the video game program may be executed within the respective user terminal 26, which may interact with the server 22 when necessary.

In either case, the video game progresses in response to user input, with the user input controlling a player character. The user's display screen may display the player character's field of view in the game world in a "first-person" manner, preferably in three dimensions, and preferably using animated video rendering (e.g. photorealistic video rendering), in the manner of a virtual camera.

Alternatively, the user's display screen may display the player character and other objects or characters in the game world in a "third-person" manner, again preferably in three dimensions, and preferably using animated video rendering (e.g. photorealistic video rendering), in the manner of a virtual camera.

Figure 3:
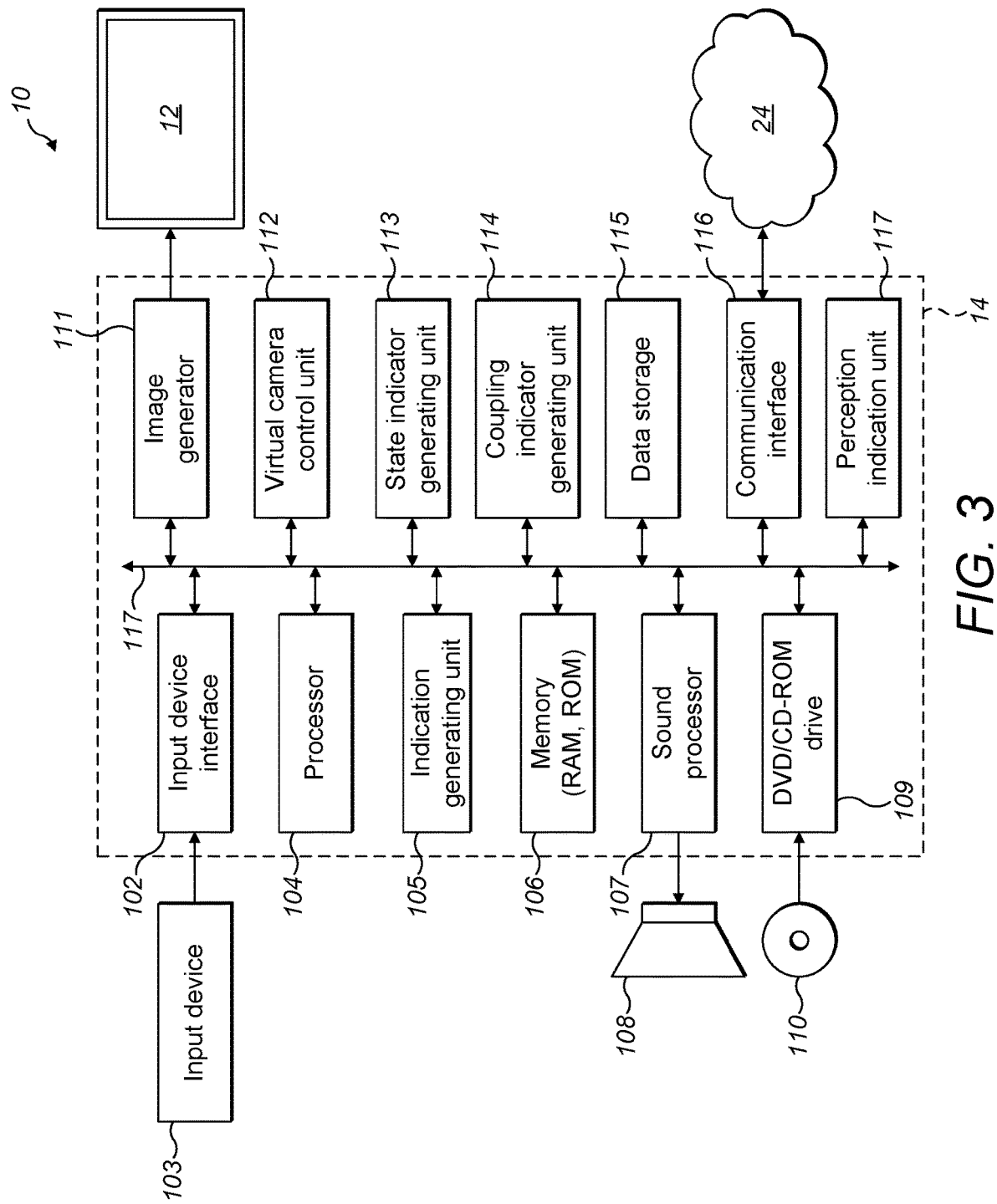
FIG. 3 is a block diagram showing the configuration of a video game apparatus as shown in FIG. 1.

FIG. 3 is a block diagram showing the configuration of the video game apparatus 10 shown in FIG. 1, in the case of the game being executed on such apparatus. It will be appreciated that the contents of the block diagram are not exhaustive, and that other components may also be present.

As illustrated, the control unit 14 of the video game apparatus 10 includes an input device interface 102 to which an input device 103 (e.g. a mouse, a keyboard or a hand-held controller, e.g. incorporating a joystick and/or various control buttons, as mentioned above) is connected, a processor (e.g. CPU) 104, and an image generator (e.g. GPU) 111 to which a display unit 12 is connected.

The control unit 14 also includes memory (e.g. RAM and ROM) 106, a sound processor 107 connectable to a sound output device 108, a DVD/CD-ROM drive 109 operable to receive and read a DVD or CD-ROM 110 (both being examples of a computer-readable recording medium), a communication interface 116 connectable to the communication network 24 (e.g. the Internet), and data storage means 115 via which data can be stored on a storage device (either within or local to the video game apparatus 10, or in communication with the control unit 14 via the network 24). For a stand-alone (not network connected) video game apparatus, the communication interface 116 may be omitted.

The video game program causes the control unit 14 to take on further functionality of a user interaction indication generating unit 105, a virtual camera control unit 112, a state indicator generating unit 113, and a coupling indicator generating unit 114.

An internal bus 117 connects components 102, 104, 105, 106, 107, 109, 111, 112, 113, 114, 115 and 116 as shown.

Figure 4:
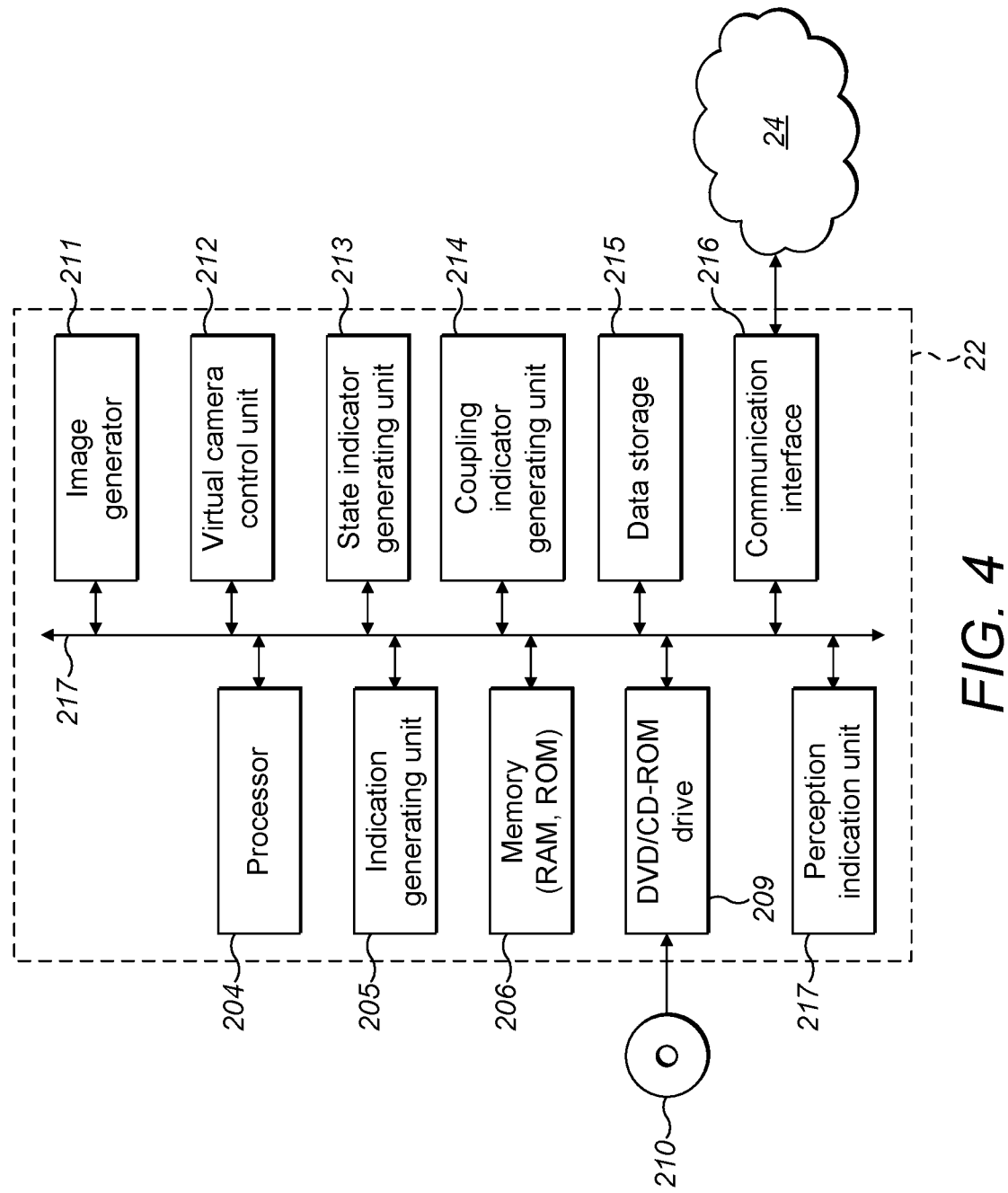
FIG. 4 is a block diagram showing the configuration of a server as shown in FIG. 2.

FIG. 4 is a block diagram showing the configuration of the server apparatus 22 shown in FIG. 2, in the case of the game being executed within a network-based video game system. It will be appreciated that the contents of the block diagram are not exhaustive, and that other components may also be present.

As illustrated, the server apparatus 22 includes a processor (e.g. CPU) 204, and an image generator (e.g. GPU) 211, memory (e.g. RAM and ROM) 206, a DVD/CD-ROM drive 209 operable to receive and read a DVD or CD-ROM 210 (both being examples of a computer-readable recording medium), a communication interface 216 connected to the communication network 24 (e.g. the Internet), and data storage means 215 via which data can be stored on a storage device (either within or local to the server apparatus 22, or in communication with the server apparatus 22 via the network 24).

The video game program causes the server apparatus 22 to take on further functionality of a user interaction indication generating unit 205, a virtual camera control unit 212, an emotion indicator generating unit 213, and an emotion coupling indicator generating unit 214.

An internal bus 217 connects components 204, 205, 206, 209, 211, 212, 213, 214, 215 and 216 as shown.

Via the communication interface 216 and the network 24, the server apparatus 22 may communicate with a user terminal 26 (e.g. video game apparatus 10) as mentioned above, during the course of the video game. Amongst other things, the server apparatus 22 may receive user input from the input device 103 of the video game apparatus 10, and may cause video output to be displayed on the display screen 12 of the video game apparatus 10.

State Indication and Coupling Indication Generation

In accordance with the present disclosure a video game comprises a virtual game world, and an indication of an emotional or physical state of a first character in the virtual game world is generated. Also generated is an indication of a coupling between the emotional or physical state of the first character and an emotional or physical state of a second, player-controlled, character.

It will be appreciated that whilst a character in a video game does not actually experience emotions as such, from the perspective of the player it is as if the characters are fully-fledged emotional beings. The emotional state of a character in the virtual game world is a useful storytelling device, in a manner analogous to that of the expression of a human actor in a play. For example, a character may appear angry, sad, happy, joyful, or any other emotion that can be represented in a video game—such as, but not limited to, fear, anxiety, surprise, love, remorse, guilt, paranoia or disgust. Similarly, whilst a character in a video game does not have a physical state as such, it will be appreciated that this term refers to a physical state assigned to the character by the video game program. The physical state experienced by a character may affect the interactions between the character and the virtual game world. For example, a physical state of a character may be drunkenness, visual impairment, cognitive impairment, mobility impairment, deafness, temperature (e.g. feeling hot or cold), pain, or any other physical state that can be represented in a video game.

In the present embodiments the first character may be described as a non-player character. However, as will be described in more detail below, the first character may instead be a character controlled by another player.

It will be appreciated that a so-called 'non-player character' is a computer-controlled character and that a 'player character' is a character controlled by a player using a compatible user input device, such as the input device 103 illustrated in FIG. 3.

In the following description and the accompanying drawings, the term 'non-player character' may be abbreviated as 'NPC', and the term 'player character' may be abbreviated as 'PC'.

As will be described in more detail below, the present disclosure provides a computer-readable recording medium including a program which is executed by a computer apparatus to provide a video game comprising a virtual game world presented to a player of the video game, and a plurality of characters in the virtual game world including a first character, and a second character controlled by the player. With reference in passing to the procedural flow diagram of FIG. 24, the program causes the state indicator generating unit 113/213 to generate 2301 a state indication, wherein the state indication is an indication of an emotional or physical state of the first character. The program also causes the coupling indicator generating unit 114/214 to generate 2302 a coupling indication, wherein the coupling indication is an indication of a coupling occurring between the emotional or physical state of the first character and an emotional or physical state of the second character.

Further, in some embodiments, and as will be discussed in greater detail below, the program may cause the interaction indication generating unit 105/205 to generate an indication that the player may provide user input to initiate coupling of the first character to the second character.

Moreover, in some embodiments, and as also discussed in greater detail below, the program may cause the perception indication unit 117/217 to generate an indication of an entity perceived by the first character.

First Embodiment

Figure 5:
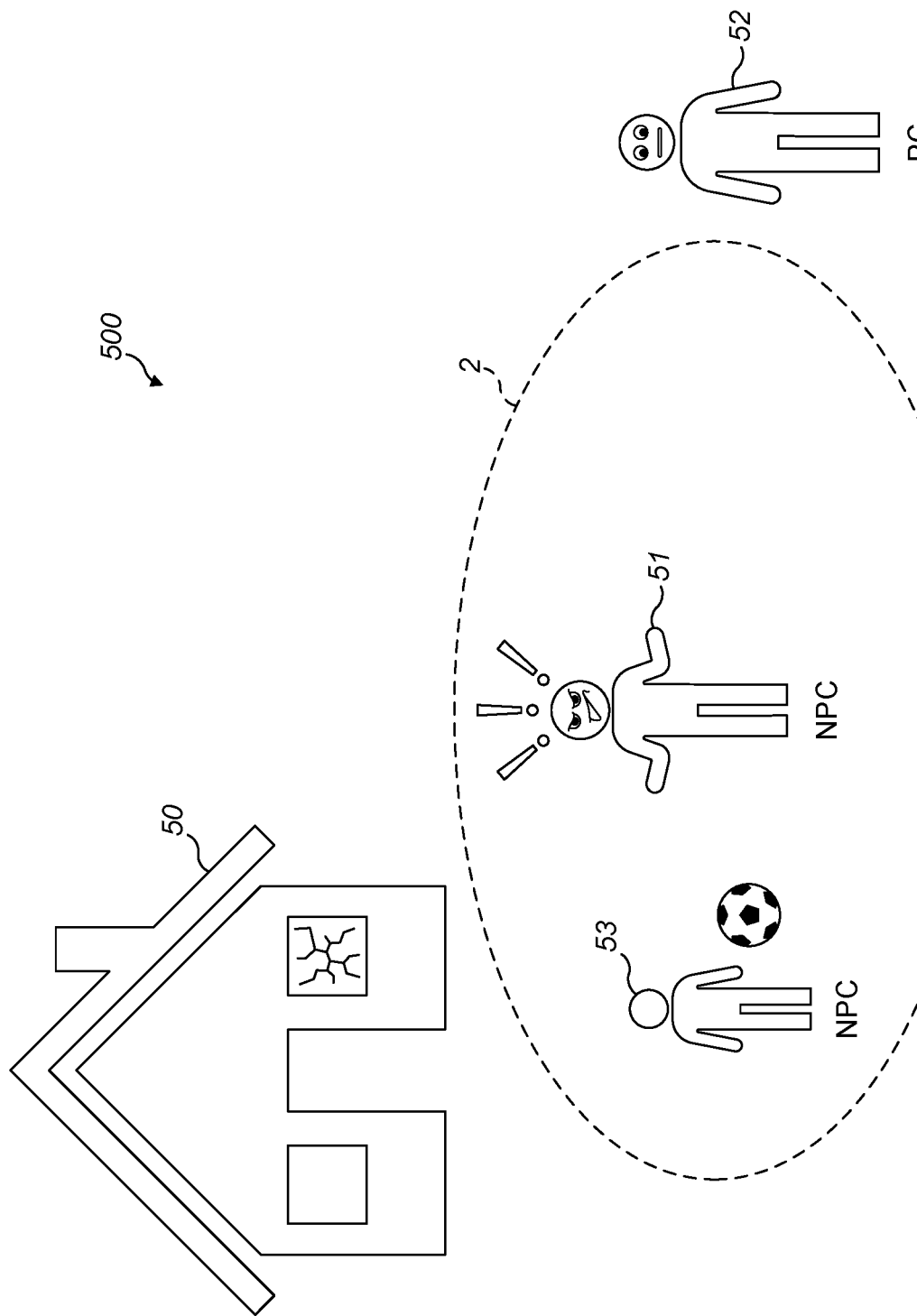
FIG. 5 is a schematic illustration of some exemplary in-game content, with a boundary corresponding to a predetermined threshold distance around an angry non-player character, and a player character who is standing further than the predetermined threshold distance from the non-player character.
Figure 6:
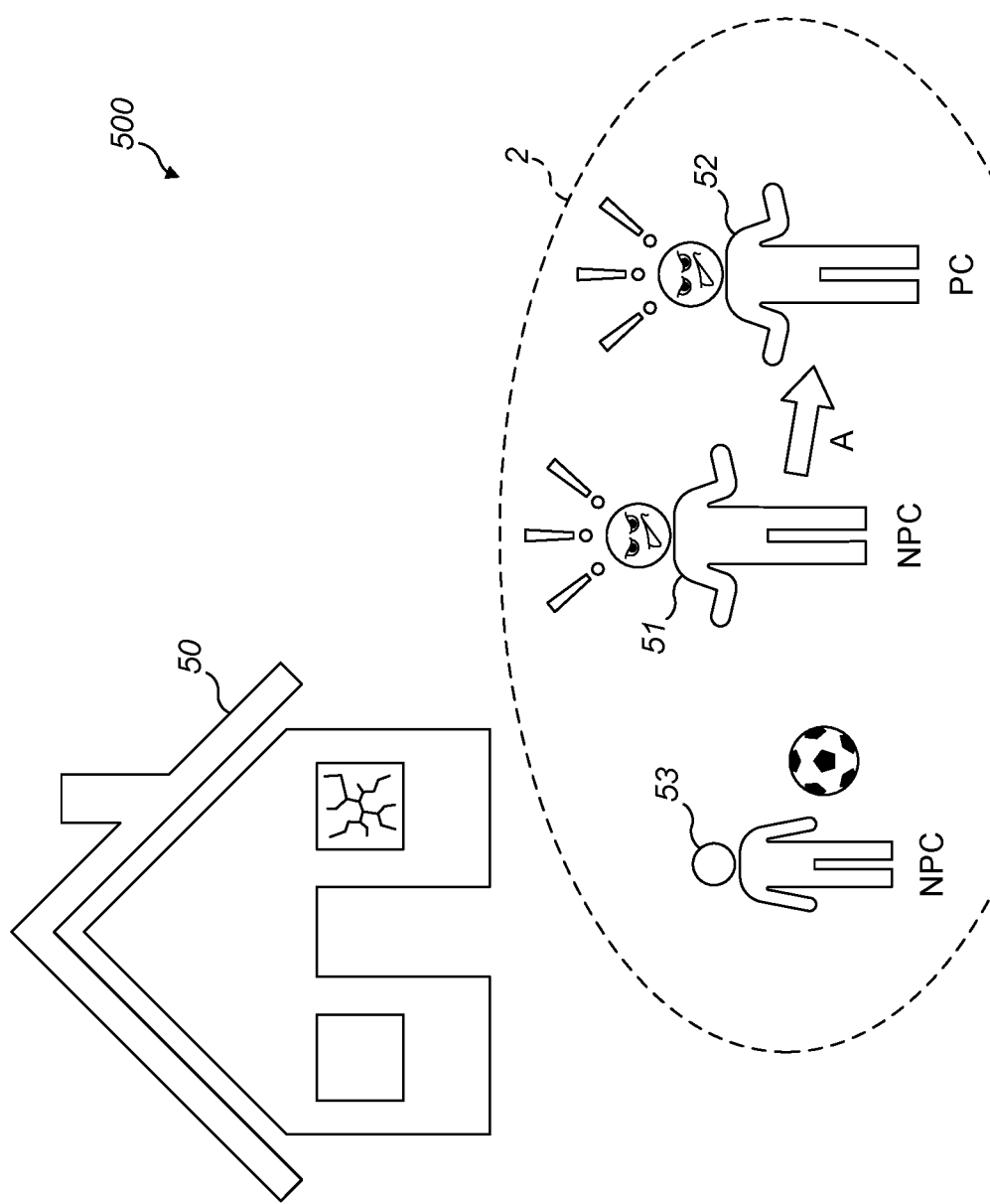
FIG. 6 shows a development of the situation illustrated in FIG. 5, with the player character now standing closer than the predetermined threshold distance from the non-player character (i.e. inside the boundary)

FIGS. 5 and 6 schematically show some exemplary in-game content (as would be presented on-screen to a user), namely a virtual game world 500 comprising an adult NPC 51, a small child NPC 53, a player character 52, and a house 50 with a broken window. In this scenario, the adult NPC 51 is angry that the small child NPC 53 has broken the window of the house whilst playing with a ball. In FIG. 5, the player character 52 is initially standing outside of a boundary 2 indicated by the dashed line. In FIG. 6, the player character has moved inside of the boundary 2.

In practice, a scene such as that illustrated in FIGS. 5 and 6 (and likewise in subsequent figures) may be generated by the image generator 111/211 and virtual camera control unit 112/212, under the control of processor 104/204 (see FIGS. 3 and 4). It will of course be appreciated that, in the present figures, black and white line drawings are used to represent what would typically be displayed to the user as rendered video (preferably photorealistic video rendering) in the game.

The boundary 2 represents a predetermined threshold distance around the adult NPC 51. In accordance with the present disclosure, and as will be described in more detail below, when the player character 52 crosses the boundary 2 to become closer than the predetermined distance from the adult NPC 51, the emotional state of the player character 52 becomes coupled to the emotional state of the adult NPC 51, such coupling being controlled by the processor 104/204.

Whilst the boundary 2 is illustrated in FIGS. 5 and 6 as being generally circular, it will be appreciated that the predetermined threshold distance may depend on the direction from which the player character 52 approaches the NPC 51 (in such cases, the boundary would not be represented by a circle, but by another shape, and possibly by an irregular shape). It will also be appreciated that the boundary may in fact correspond to boundary in three-dimensional space, in which case the boundary may be represented by, for example, a sphere or hemisphere around the adult NPC 51.

Whilst the boundary 2 is shown in FIGS. 5 and 6 (and some of the later figures) to help clarify the concept of the predetermined threshold distance, it will be appreciated that the boundary 2 need not necessarily be presented to the player. In other words, the boundary 2 need not necessarily be shown on the screen. However, if the boundary 2 is to be shown on the screen then the coupling indicator generating unit 114/214 is configured to generate a graphical indication of the predetermined threshold distance in the virtual game world, that is visible on the user's screen.

Although, in the figures, exclamation mark symbols are shown by the heads of certain characters to highlight that those characters are experiencing an emotion of some kind, it will be appreciated that such symbols need not be used in the game itself.

To recap, in the virtual game world 500 of FIGS. 5 and 6, the small child NPC 53 has broken a window of the house 50 with a ball, causing the nearby adult NPC 51 to become angry. Initially, as shown in FIG. 5, the player character 52 is outside of the boundary 2, and so the player character 52 is further than the predetermined threshold distance from the adult NPC 51. Therefore, in the situation illustrated in FIG. 5, the emotional state of the player character 52 is not coupled to the emotional state of the adult NPC 51.

FIG. 6 shows a development of the situation illustrated in FIG. 5 in which the player character 52 is now inside the boundary 2, and is closer than the predetermined threshold distance from the adult NPC 51. As a result, the emotional state of the player character 52 is now coupled to the emotional state of the adult NPC 51. Since the adult NPC 51 is angry, the player character 52 also becomes angry, mirroring the emotional state of the adult NPC 51.

In the embodiment illustrated in FIGS. 5 and 6, the emotional state of the adult NPC 51 is indicated by a facial expression of the adult NPC 51. Similarly, the emotional state of the player character 52 is indicated by the facial expression of the player character 52. Other methods of indicating the emotional state of a player character 52 or NPC 51 will be described in more detail below.

Figure 7:
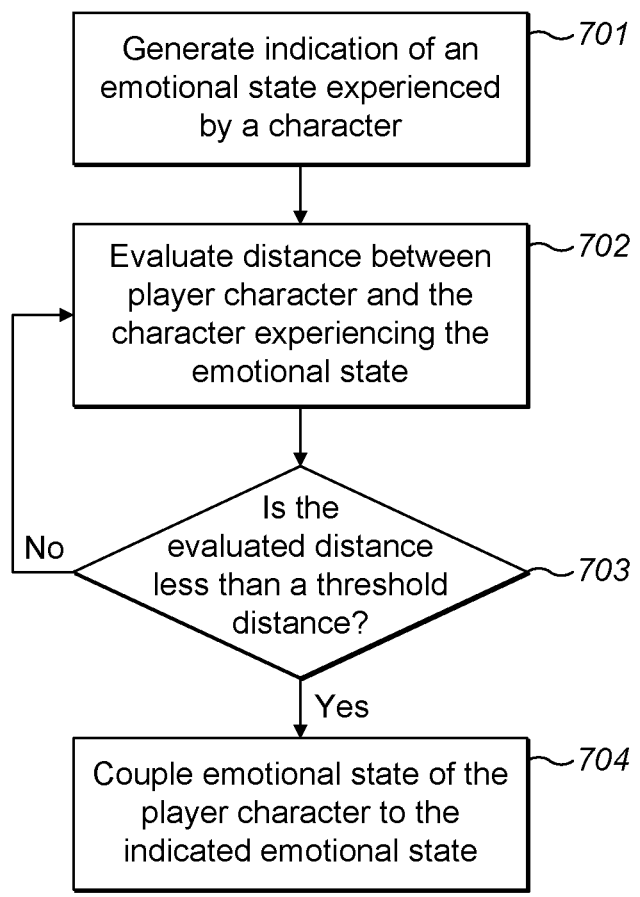
FIG. 7 is a procedural flow diagram of an emotional state coupling routine in which an indication of an emotional state experienced by a character is generated, and an emotional state of a player character is coupled to the indicated emotional state if the player character is less than a threshold distance from the character experiencing the emotional state.

FIG. 7 is a procedural flow diagram of an emotional state coupling routine according to the first embodiment.

In step 701, the routine causes the state indicator generating unit 113/213 to generate an indication of an emotional state experienced by a character. For example, as shown in FIGS. 5 and 6, the indication of the emotional state may comprise, but is not limited to, a particular facial expression.

In step 702, the routine causes the coupling indicator generating unit 114/214 to evaluate the distance between the player character 52 and the character experiencing the emotional state 51. In the example illustrated in FIGS. 5 and 6, the adult NPC 51 is the character experiencing the emotional state (the emotional state of anger), and so the distance between the player character 52 and the adult NPC 51 is evaluated. It will of course be appreciated that the evaluated distance corresponds to a distance in the virtual game world, and may be evaluated using any suitable method, such as by performing a calculation using a coordinate system within the virtual game world.

In step 703, the routine causes the coupling indicator generating unit 114/214 to determine whether the distance evaluated in step 702 is less than a threshold distance. In this embodiment, the threshold distance is a predetermined threshold distance stored in the data storage means 115/215. For example, the threshold distance may be determined in advance by the game designer.

If the result of the determination in step 703 is that the evaluated distance is greater than or equal to the threshold distance, then the routine proceeds along the path marked 'No', and the processing returns to step 702. It will be appreciated that, in this case, the routine may wait for a short period of time (e.g. half a second) before causing the coupling indicator generating unit 114/214 to re-evaluate the distance between the player character 52 and the character experiencing the emotional state 51, in order to avoid continuously performing the evaluation of step 702, which may otherwise cause excessive processing load within the control unit 14 or server 22.

If the result of the determination in step 703 is that the evaluated distance is less than the threshold distance, then the routine proceeds along the path marked 'Yes', and the processing proceeds to step 704.

In step 704, the routine causes the processor 104/204 to couple the emotional state of the player character 52 to the indicated emotional state. In the example illustrated in FIG. 6, the emotional state of the player character 52 is coupled to the emotional state of the adult NPC 51, such that the player character 52 becomes angry, mirroring the emotional state of the adult NPC 51.

Figure 8:
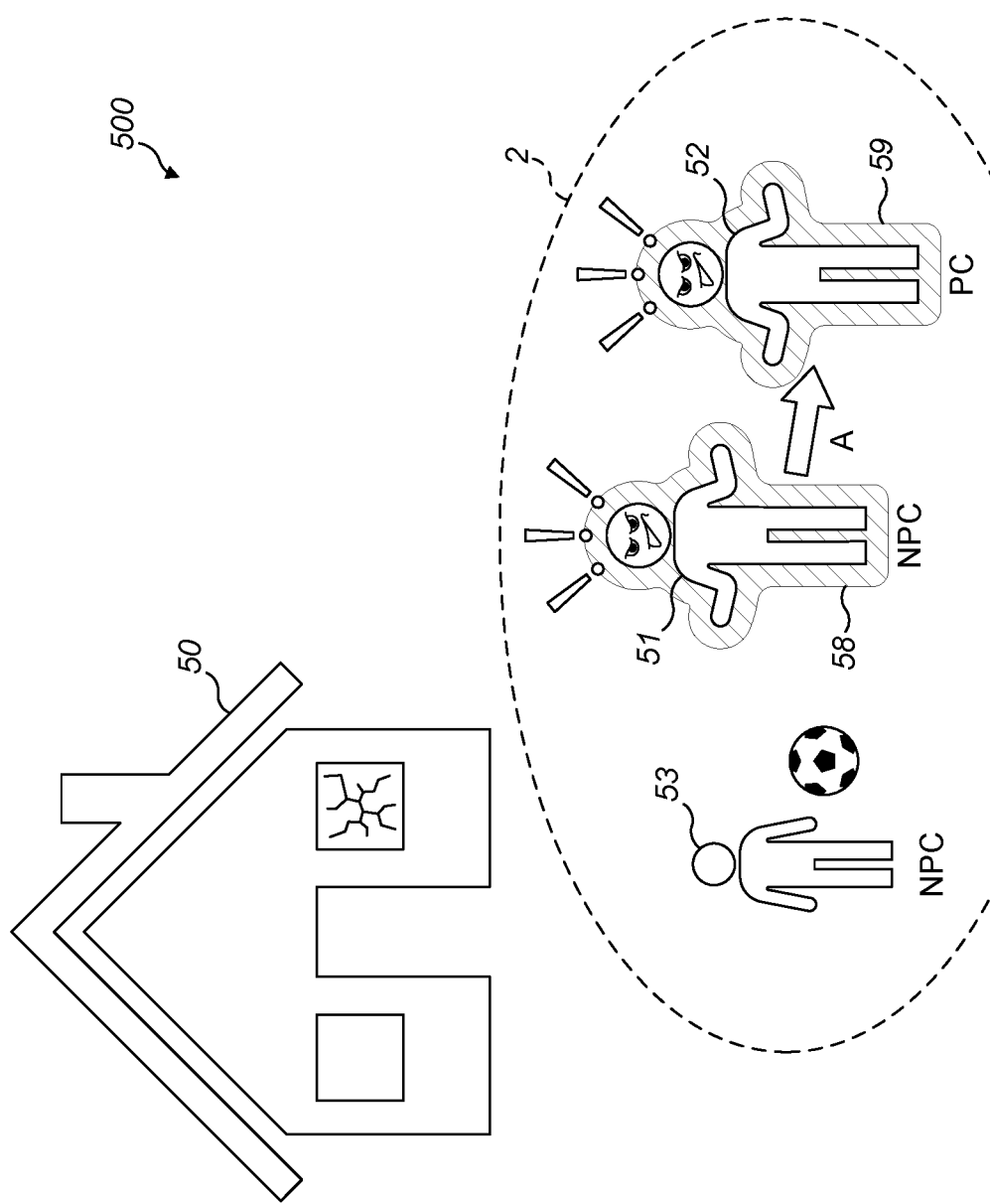
FIG. 8 shows a modified version of FIG. 6 in which an emotional coupling indication is shown around the player character and the non-player character.

FIG. 8 shows a modification of FIG. 6 in which an indication of the coupling between the emotional state of the player character 52 and the emotional state of the NPC 51 is additionally generated. In this example, the indication comprises a glow effect 58 around the NPC 51, and a corresponding glow effect 59 around the player character 52. Various methods of providing an indication of a coupling between two characters in the virtual game world will be described in more detail below. Beneficially, in this example, the player is provided with an indication that the emotional state of the player character 52 is coupled to the emotional state of the NPC 51, and so the player is able to understand that the change in the emotional state of the player character 52 is due to this coupling. Whilst in the example of FIG. 8 the indication of the coupling is shown around both the NPC 51 and the player character 52, it will be appreciated that the coupling may instead be shown only around the player character 52, or only around the NPC 51. Moreover, the indication need not necessarily be a graphical indication. For example, the indication may comprise a sound.

Second Embodiment

Figure 9:
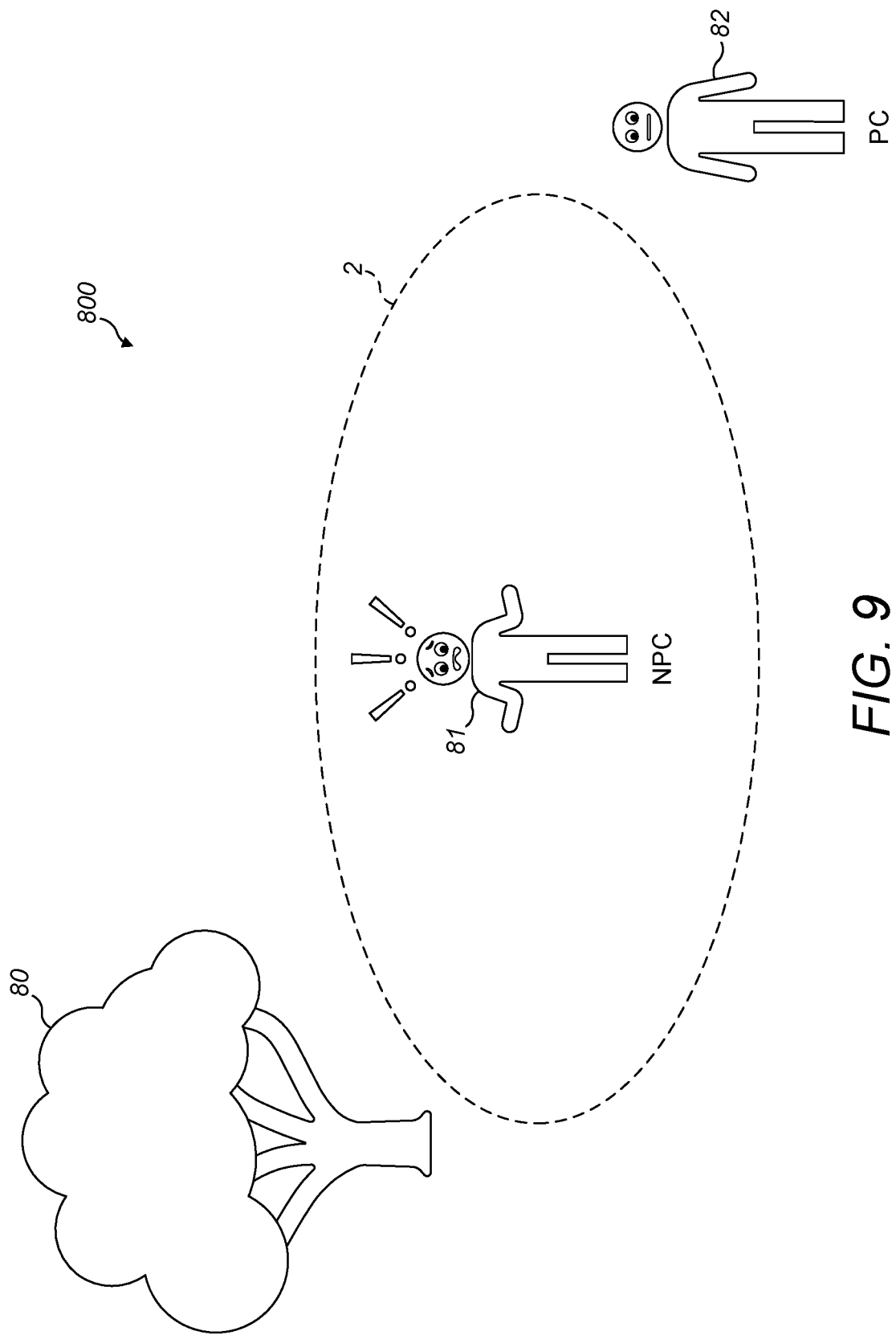
FIG. 9 is a schematic illustration of some exemplary in-game content, with a boundary corresponding to a predetermined threshold distance around a scared non-player character, a player character who is standing further than the predetermined threshold distance from the non-player character, and a tree observed by the player character.
Figure 10:
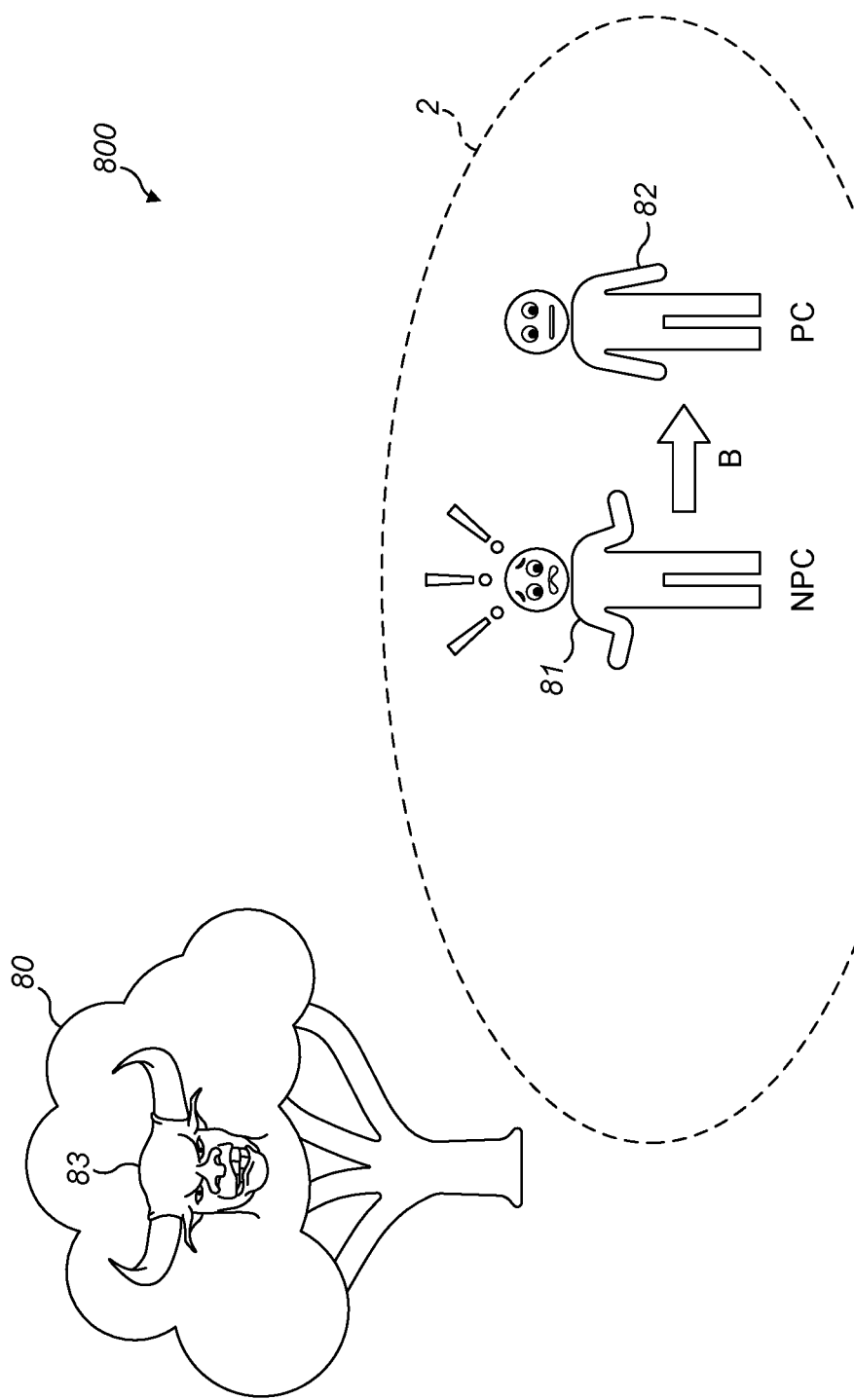
FIG. 10 shows a development of the situation of FIG. 9, with the player character now standing closer than the predetermined threshold distance from the non-player character (i.e. inside the boundary), and a modified tree observed by the player character.

FIGS. 9 and 10 show some further exemplary in-game content (as would be presented on-screen to a user), namely a virtual game world 800 comprising an NPC 81, a player character 82, and a tree 80. In this case, the NPC 81 has an anxious expression, as the NPC 81 is perceiving there to be a monster 83 in the tree 80 (see FIG. 10). Within the context of the game, the monster 83 is in the mind of the NPC 81 and, although perceived as 'real' from the point of view of the NPC 81 and thereby causing the NPC 81 to be anxious, is not real from the point of view of the player character 82 or any other character in the virtual game world.

As shown in FIG. 9, the monster 83 is not initially visible to the user, and only becomes visible to the user once the player character 82 has coupled with the NPC 81, as shown in FIG. 10—upon which the player character 82 then sees the game world (including the monster 83) as though through the eyes of the NPC 81. Throughout this process, what is presented to the user on-screen corresponds to what the player character 82 sees (including what the player character 82 sees as though through the eyes of the NPC 81).

Thus, in FIG. 9 the player character 82 is initially standing outside of a boundary 2 indicated by the dashed line. In FIG. 10, the player character 82 has moved inside of the boundary 2, thereby coupling with the NPC 81 and causing the imaginary monster 83 to be revealed. The boundary 2 represents a predetermined threshold distance around the NPC 81.

In accordance with the present disclosure, when the player character 52 crosses the boundary 2 to become closer than the predetermined distance from the adult NPC 51, the player character 52 becomes coupled to the NPC 51 and an indication of an entity (e.g. monster 83) perceived by the NPC 81 is generated by the perception indication unit 117/217. As in the illustrated example, the entity perceived by the NPC 51 may be an entity perceived visually by the NPC 51 that is not actually a 'real' entity in the virtual game world. For example, if the NPC 81 is hallucinating, the NPC 81 may perceive an entity that is not perceived by other characters in the virtual game world under normal conditions.

Further, FIG. 10 shows a development of the situation of FIG. 9 in which the player character 82 is now inside the boundary 2, and is closer than the predetermined threshold distance from the adult NPC 51. As a result, the player character 82 becomes coupled to the NPC 81, and an indication 83 of the entity (monster 83) perceived by the NPC 81 is generated (i.e. revealed) by the perception indication unit 117/217.

To recap, in this example, the monster 83 is not considered to be a 'real' entity in the game world, and is considered to exist only in the mind of the NPC 81. In other words, the monster 83 exists in the imagination of the NPC 81, and would not normally be perceived by the player character 82 or any other character in the virtual game world. However, when the player character 82 is coupled to the NPC 81, the indication of the entity 83 perceived by the NPC 81 is generated, and so the player is able to identify the entity that is causing the NPC 81 to become anxious. In other words, the virtual game world presented to the player is modified by the perception indication unit 117 to include the entity perceived by the NPC 81, once the player character 82 has coupled to the NPC 81.

Figure 11:
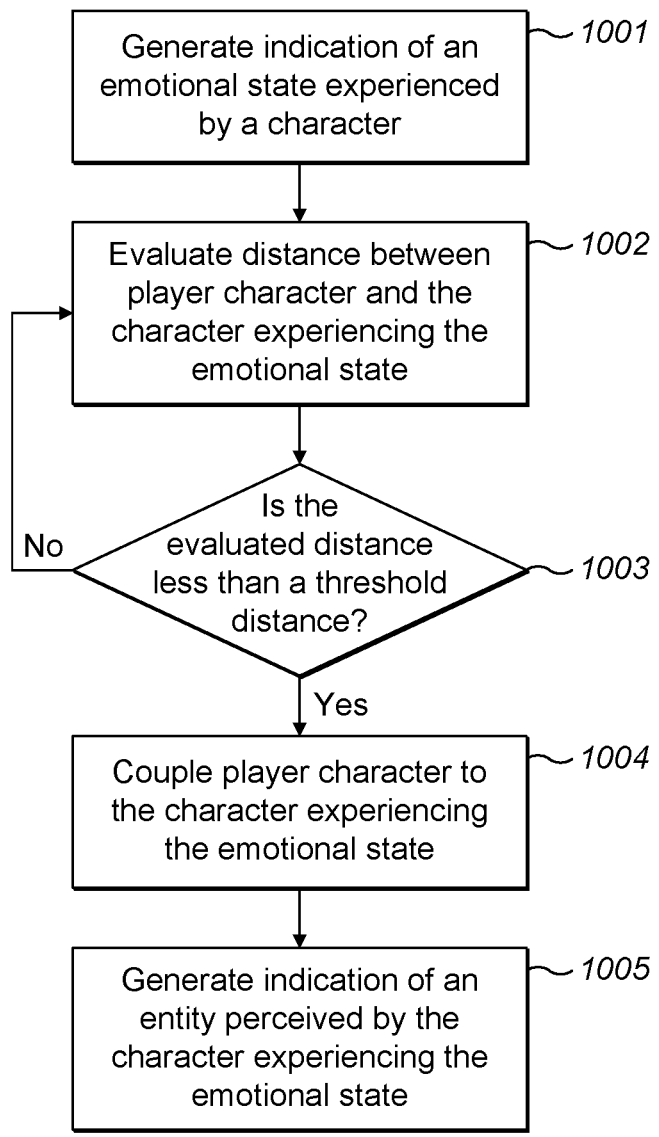
FIG. 11 is a procedural flow diagram of a perception indication generating routine in which an indication of an entity perceived by a character experiencing an emotional state is generated if the player character is less than a threshold distance from the character experiencing the emotional state.

FIG. 11 is a procedural flow diagram of a coupling routine for generating an indication of an entity perceived by a character, according to the second embodiment.

In step 1001, the routine causes the state indicator generating unit 113/213 to generate an indication of an emotional state experienced by the NPC 81. For example, as shown in FIGS. 9 and 10, the indication is the facial expression of the NPC 81, indicating that the NPC 81 is anxious.

In step 1002, the routine causes the coupling indicator generating unit 114/214 to evaluate the distance between the player character 82 and the character 81 experiencing the emotional state. In this example, the character experiencing the emotional state is the NPC 81, who is experiencing the emotional state of anxiety. It will of course be appreciated that the evaluated distance corresponds to a distance in the virtual game world, and may be evaluated using any suitable method, such as by performing a calculation using a coordinate system within the virtual game world.

In step 1003, the routine causes the coupling indicator generating unit 114/214 to determine whether the distance evaluated in step 1002 is less than a threshold distance. In this embodiment, the threshold distance is a predetermined threshold distance stored in the data storage means 115/215. For example, the threshold distance may be determined in advance by the game designer.

If the result of the determination in step 1003 is that the evaluated distance is greater than or equal to the threshold distance, then the routine proceeds along the path marked 'No', and the processing returns to step 1002. It will be appreciated that, in this case, the routine may wait for a short period of time (e.g. half a second) before causing the coupling indicator generating unit 114/214 to re-evaluate the distance between the player character 82 and the character experiencing the emotional state 81, in order to avoid continuously performing the evaluation of step 1002, which may otherwise cause excessive processing load within the control unit 14 or server 22.

If the result of the determination in step 1003 is that the evaluated distance is less than the threshold distance, then the routine proceeds along the path marked 'Yes', and the processing proceeds to step 1004.

In step 1004, the routing causes the processor 104/204 to couple the player character 82 to the character experiencing the emotional state 81, and the processing proceeds to step 1005.

In step 1005, an indication of an entity perceived by the character experiencing the emotional state is indicated. In the example illustrated in FIG. 10, the indication is an indication of the monster 83 perceived by the NPC 81.

Figure 12:
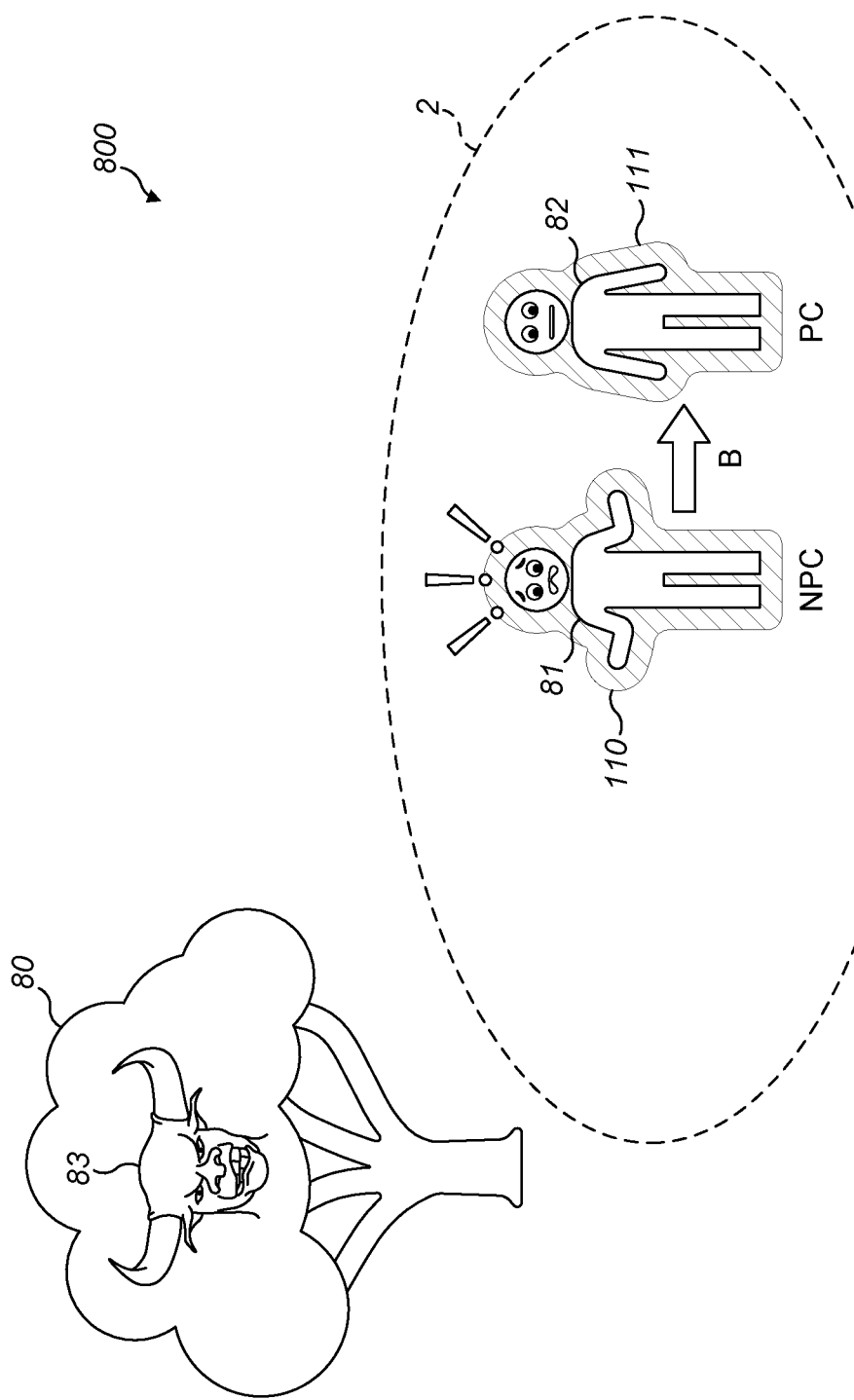
FIG. 12 shows a modified version of FIG. 10 in which a coupling indication is shown around the player character and the non-player character.

FIG. 12 shows a variant of FIG. 10 in which an indication of the coupling between the player character 82 and the NPC 81 is additionally generated. In this example, the indication comprises a glow effect 110 around the NPC 81 and a corresponding glow effect 111 around the player character 82. Various methods of providing an indication of a coupling between two characters in the virtual game world will be described in more detail below. Beneficially, in this example, the player is provided with an indication that the player character 82 is coupled to the NPC 81, and so the player is able to understand that the indication 83 of the monster has been generated due to this coupling.

Figure 13:
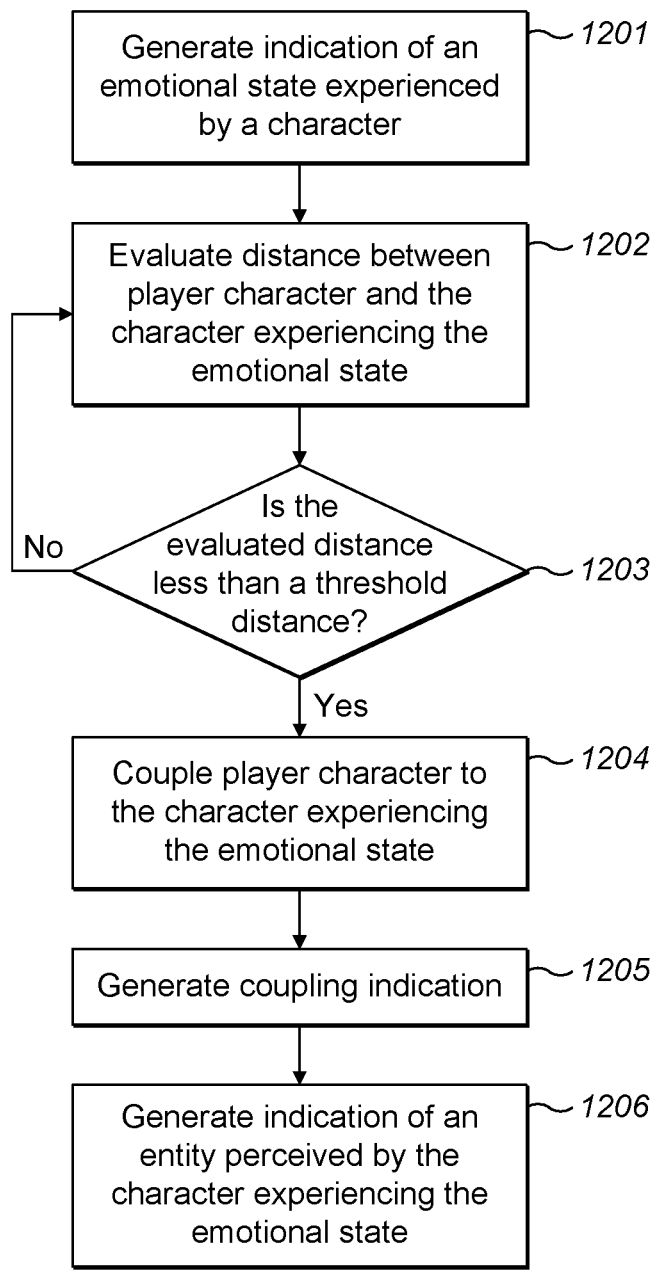
FIG. 13 shows a modified version of the procedural flow diagram of FIG. 11, in which a coupling indication is additionally generated.

FIG. 13 is a modified version of the procedural flow diagram of FIG. 11. Steps 1201 to 1204 correspond to steps 1001 to 1004 of FIG. 11, respectively, and will not be described again here. Similarly, step 1206 corresponds to step 1005 of FIG. 11.

In step 1205, an indication of the coupling between the player character 82 and the NPC 81 experiencing the emotional state is generated. In the example shown in FIG. 12, this indication comprises a graphical indication 110 around the NPC 81 and a corresponding graphical indication 111 around the player character 82. Whilst in the example of FIG. 12 the indication of the coupling is shown around both the NPC 81 and the player character 82, it will be appreciated that the coupling may instead be shown only around the player character 82, or only around the NPC 81. Moreover, the indication need not necessarily be a graphical indication. For example, the indication may comprise a sound.

Third Embodiment

Figure 14:
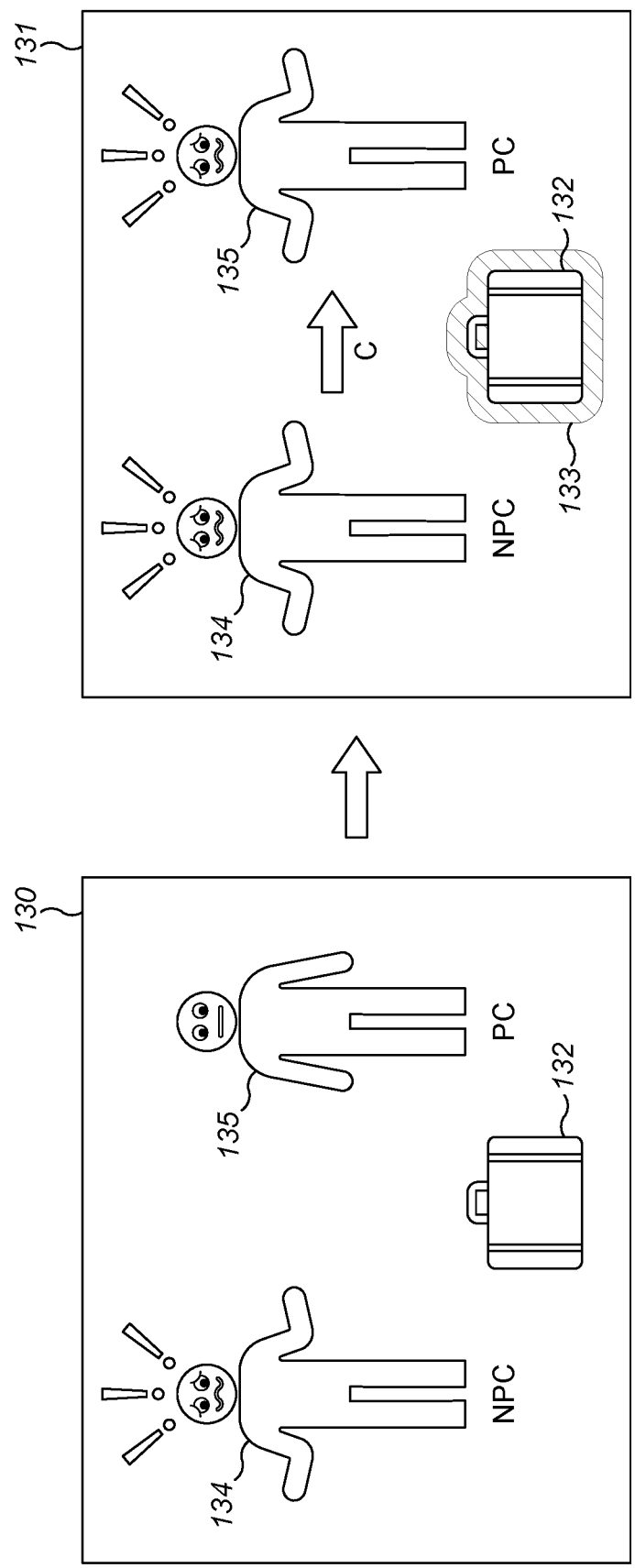
FIG. 14 depicts a first schematic screenshot showing an anxious non-player character and a player character, and a second schematic screenshot in which the non-player character is coupled to the player character and an indication around a bag perceived by the non-player character is shown.

FIG. 14 shows two sequential scenes 130, 131 of a virtual game world comprising an NPC 134, a player character 135 and a briefcase 132. The NPC 134 has an anxious expression.

In the first scene 130, the player is able to determine that the NPC 134 is anxious, based on the expression on the face of the NPC 134. The briefcase 132 is a 'real' object in the game world that can be seen by both the NPC 134 and the player character 135.

In the second scene 131, the player character 135 has become coupled to the NPC 134, and as a result an indication 133 (e.g. a glow effect) has been generated around the briefcase 132 by the perception indication unit 117/217. The player character 135 may become coupled to the NPC 134 as a result of a scripted or random event, or in response to any other suitable trigger, such as crossing a boundary or threshold as described above. The indication 133 identifies to the player that the briefcase is causing the NPC 134 to be anxious. For example, the characters 134/135 may be in an airport and the briefcase 132 may be a suspicious, unattended item of luggage, causing the NPC 134 to become anxious.

An indication (e.g. 133) of an entity perceived by the NPC 134 may comprise more than a simple graphical indication around the entity. For example, the player may be provided with the thoughts of the NPC character regarding the entity. In this example, the player may hear a line of dialogue such as "That bag looks very suspicious. Perhaps I should alert the authorities." The line of dialogue may be provided in text and/or audible form. In one example, the dialogue may be presented to the player when the player directs the virtual camera of the video game towards the briefcase 132.

The indication 133 of the entity (e.g. briefcase 132) perceived by the NPC 134 may indicate that the player may interact with the entity (e.g. briefcase 132) in the virtual game world. For example, in scene 131 the indication may further or alternatively comprise a button prompt indicating that the user may open the briefcase 132 to inspect the contents of the briefcase.

In contrast to the example shown in FIG. 10, the briefcase 132 causing the NPC 134 to be anxious is a 'real' object in the game world, as opposed to the monster 83 of FIG. 10 which exists only in the virtual mind of the NPC 81. Therefore, the briefcase 132 can be perceived by both the player character 135 and the NPC 134, even before the player character 135 is coupled to the NPC 134.

In this example, when the player character 135 is coupled to the NPC 134, the emotional state of the player character 135 is coupled to the emotional state of the NPC 134, in addition to the generation of the indication 135 identifying the briefcase 132. However, it will be appreciated that this need not necessarily be the case, and that the indication 135 identifying the entity causing the NPC 134 to be anxious may be generated without the emotional or physical state of the player character 135 being coupled to that of the NPC 134.

In other variants, the entity that is causing the first character to be emotionally affected may be a 'real' object within the game world, but one that is initially not visible to the player, e.g. due to being hidden or obscured by another object. In such cases the perception indication unit 117/217 may be configured to reveal the entity to the player. This may include applying some kind of on-screen highlighting to the entity, or moving the entity into a visible position, or making the other object that is obscuring the entity become at least partially transparent, thereby enabling the player to see said entity on-screen.

Coupling or State Indications

Figure 15A:
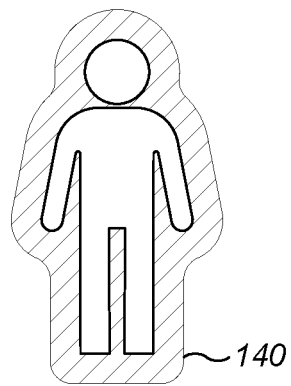
FIG. 15a depicts a first graphical indication.
Figure 15B:
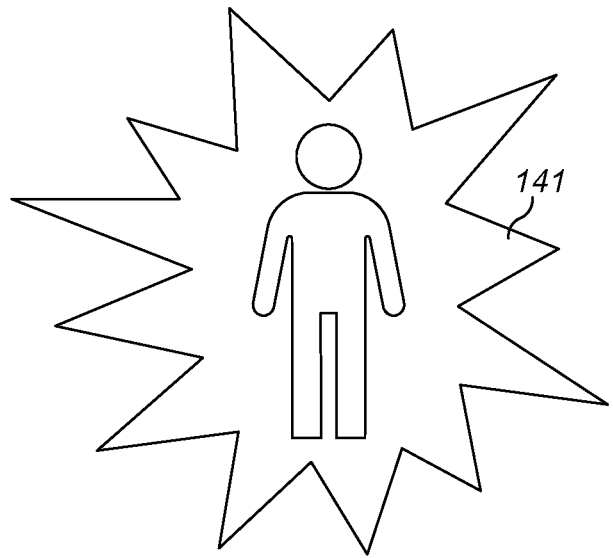
FIG. 15b depicts a second graphical indication.
Figure 15C:
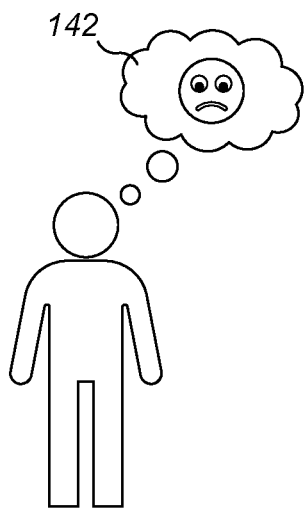
FIG. 15c depicts a third graphical indication.
Figure 15D:
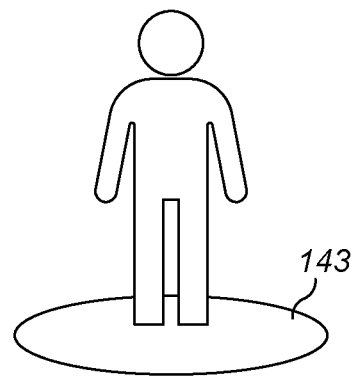
FIG. 15d depicts a fourth graphical indication.

FIGS. 15a to 15d show exemplary graphical indications that may be used to indicate the emotional or physical state of a character (i.e. a state indication) or, in the case of FIGS. 15a, 15b and 15d, a coupling indication, as may be employed in the above-described embodiments.

FIG. 15a shows an example of a so-called "visible aura" around a character. In this example the visible aura is in the form of a glow effect 140. The glow effect 140 may be coloured, or may simply be an increase in the brightness of an area around the character. The glow effect 140 may also be displayed as a distortion effect around the character, such as a heat haze effect. Whilst in FIG. 15a the glow effect 140 is shown entirely surrounding the character, this need not necessarily be the case, and alternatively it may only partially surround the character.

For example, when the effect is used to indicate a coupling of the player character 52 to the adult NPC 51 shown in FIGS. 5 and 6, the effect may only surround a part of the player character 52 that is closest to the NPC 51. For instance, if the player character 52 is standing outside of the boundary 2 representing the predetermined threshold distance, but the player character has an outstretched arm that extends inside of the boundary 2, then only the part of the player character that is inside the boundary may be surrounded by the glow effect 140 (i.e. the part of the outstretched arm that is less than the predetermined threshold distance from the adult NPC 51).

FIG. 15b illustrates a border 141 around the character. In one example, the border 141 may be a simple outline drawn around the character, and could be drawn using any suitable shape, such as a multi-pointed star, a circle, or such like.

FIG. 15c shows a thought bubble 142 indicating that a character is sad. In this example, the thought bubble 142 comprises an image showing a sad expression on the face of a character. However, this need not necessarily be the case, and the thought bubble could instead, for example, comprise text indicating the emotional state of the character.

FIG. 15d shows an indication 143 below the character. In this example, the indication is shown as a circle 143 below and surrounding the character (e.g. projected on the ground). The indication 143 may correspond to, for example, a change in brightness, a change in colour, or a distortion effect.

Graphical indications of the form shown in FIGS. 15a, 15b and 15d may be used to indicate that a player-controlled character is coupled to an NPC (such as the coupling indicated by arrow A in FIG. 6, or indicated by arrow B in FIGS. 10 and 12), or to indicate an entity perceived by a character in the virtual game world (such as the monster 83 illustrated in the tree 80 of FIG. 12, or the briefcase 132 of FIG. 14). Such graphical indications may be applied to either the player character or the NPC, or both, to indicate that they are coupled.

Figure 16A:
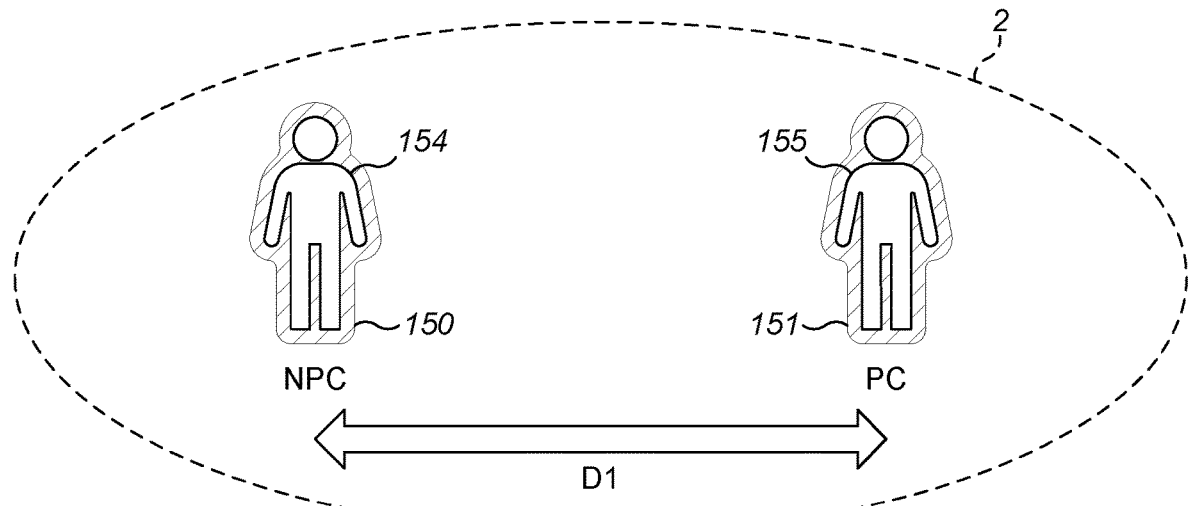
FIG. 16a depicts a player character and a non-player character separated by a first distance, and having corresponding indications of a first type.
Figure 16B:
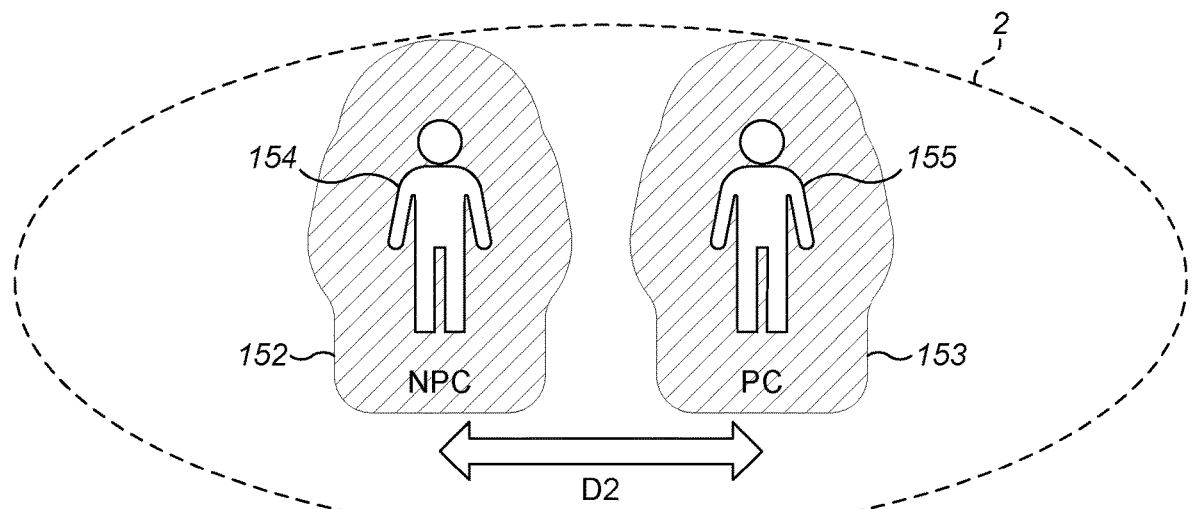
FIG. 16b depicts the player character and the non-player character of FIG. 16a separated by a second distance, smaller than the first distance, and having corresponding indications of a second type.

FIGS. 16a and 16b show an example in which a player character 155 is closer than a predetermined threshold distance (indicated by the boundary 2) from an NPC 154, and the player character 155 has therefore coupled to the NPC 154. The coupling between the NPC 154 and the player character 155 is indicated by the graphical indication 150 around the NPC 154 and a corresponding graphical indication 151 around the player character 155. In this example, as the player character 155 moves within the boundary, the graphical indications 150, 151 are modified based on the distance between the NPC 154 and the player character 155.

More particularly, as shown in FIG. 16a, the NPC 154 and the player character 155 are initially separated by a distance D1 in the virtual game world, indicated by the arrow. The NPC 154 and the player character 155 are surrounded by corresponding graphical indications 150, 151 of a first size.

In the development illustrated in FIG. 16b, the NPC 154 and the player character 155 of FIG. 16a have moved closer together, and are now separated by a distance D2 in the virtual game world (smaller than distance D1) indicated by the arrow. As a result of the decrease in distance between the NPC 154 and the player character 155, the size of the graphical indications 152, 153 around the NPC 154 and player character 155 have been increased.

The increased size of the graphical indications 152, 153 in FIG. 16b may simply be a visual aid to reinforce the fact that the characters are coupled. Alternatively, in other variants, the increased size of the graphical indication may denote an increased strength of coupling, which for example enables the player character 155 to perceive greater insight into the emotions of the NPC 154.

In variants in which the coupling indication or state indication comprises a sound, the sound may increase in volume as the distance between the player character 155 and the NPC 154 decreases. Similar to the above example, such an increase in volume may simply be to reinforce the fact that the characters are coupled, or may denote an increased strength of coupling, as outlined above.

Figure 17:
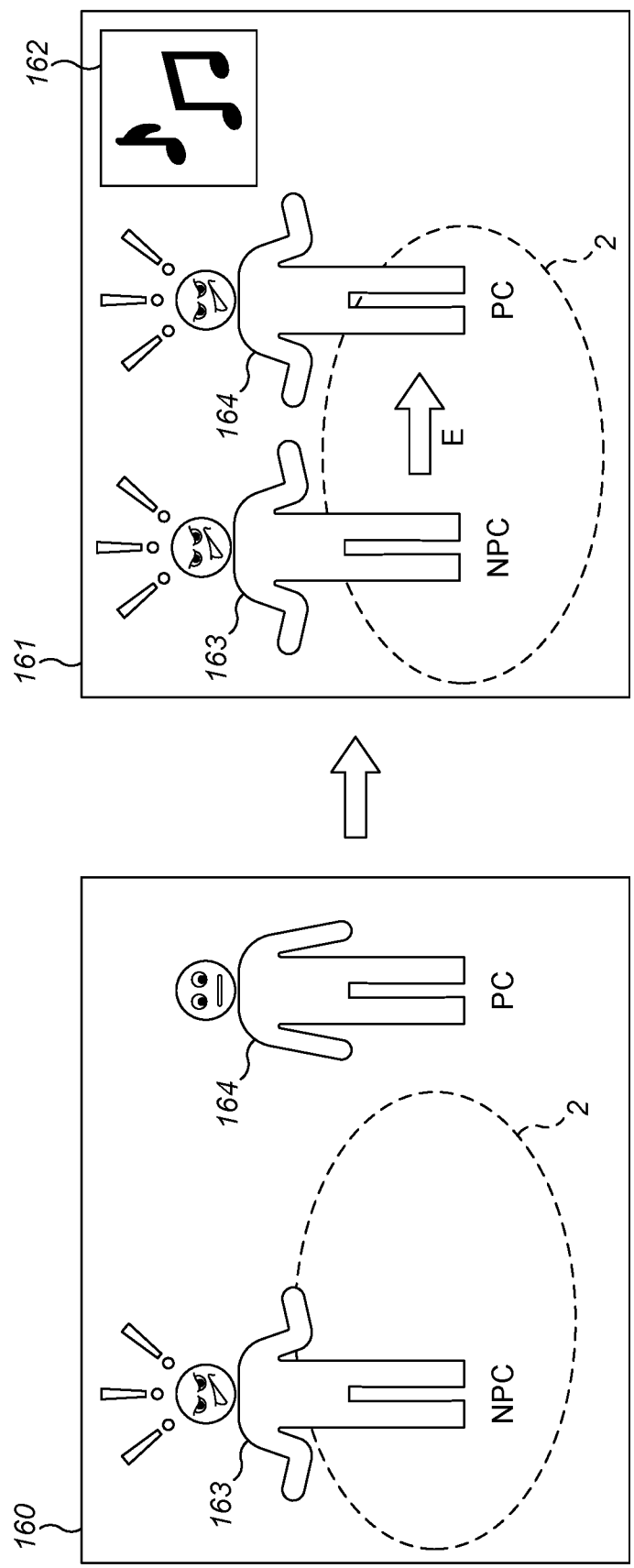
FIG. 17 depicts a first schematic screenshot showing an angry non-player character and a player character standing outside of a boundary around the non-player character, and a second schematic screenshot in which the player character is standing inside the boundary and a sound is generated.

FIG. 17 shows two sequential scenes 160, 161 of a virtual game world comprising an NPC 163 and player character 164. The NPC 163 has an expression indicating that the NPC is angry. In scene 160 the player character 164 is standing outside of a boundary 2 that indicates a predetermined threshold distance around the NPC 163.

In scene 161, the player character 164 is now closer than the predetermined threshold distance from the NPC 163 and so the emotional state of the player character 164 has become coupled to that of the NPC 163, as indicated by arrow E. In this example, a sound 162 is generated to indicate the coupling between the emotional states.

It will be appreciated that the indication that the emotional state of the player character 164 is coupled to the emotional state of the NPC 163 need not necessarily be restricted to only a sound or only a graphical indication, but may instead comprise a combination of sound(s) and graphical indication(s). For example, as shown in scene 161, the angry expression on the face of the player character 164 is a graphical indication of the coupling, and the sound 162 is an audible indication of the coupling.

FIG. 18 shows an illustrative example of an indication lookup table, to which the routines of certain embodiments may refer. The first column of the table indicates a threshold distance between a player character and a character experiencing an emotional state. For example, the distance may correspond to the distance between the NPC 154 and the player character 155 illustrated in FIGS. 16a and 16b. The second column of the table shows an indication type that is associated with the distance in the same row, and the third column indicates a corresponding intensity of the indication. The intensity of a graphical indication may correspond to the size, brightness or colour of the indication. The intensity of an audible indication may correspond to a volume of the indication.

In the example shown in FIG. 18, distances D1 to D5 are such that:

D1>D2>D3>D4>D5

The table indicates that an indication of a first type, "1 (glow, no audio)", having an intensity of 1, is associated with a threshold distance D1. Similarly, the table indicates that an indication of a first type "1 (glow, no audio)", having an intensity of 2, is associated with a threshold distance D2. When the player character is at a distance that is less than or equal to distance D1, but greater than distance D2, a determination is made to generate an indication of the first type (glow, no audio) and having an intensity of 1. When the player character is at a distance that is less than or equal to distance D2 and greater than distance D3, a determination is made to generate an indication of the first type (glow, no audio) and having an intensity of 2. Corresponding determinations may be made based on distances D3 and D4. Since in this example D5 is the shortest distance in the table, the corresponding indication (of the second type, having an intensity of 2) is generated simply when the distance between the player character and the NPC is smaller than distance D5.

Figure 19:
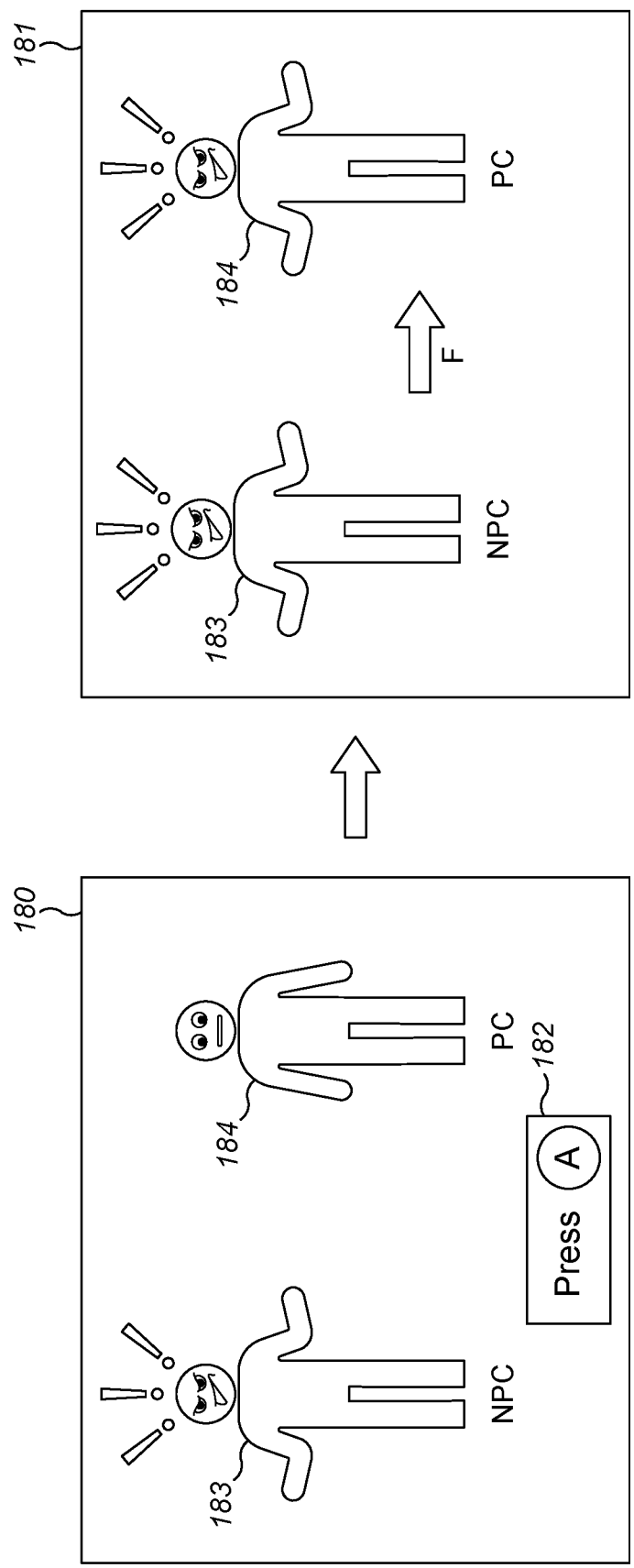
FIG. 19 depicts a first schematic screenshot showing an angry non-player character, a player character and an indication that a player may couple the emotional state of the player character to that of the non-player character, and a second schematic screenshot in which the emotional state of the player character is coupled to that of the non-player character.

FIG. 19 depicts a variant of the situation illustrated in FIGS. 5 and 6, and shows two sequential scenes 180, 181 of a virtual game world comprising an NPC 183 and player character 184. The NPC 183 has an expression indicating that the NPC 183 is angry.

In scene 180, an indication 182 that the player may provide user input to initiate a coupling between an emotional state of the player character 184 and an emotional state of the NPC 183 is also shown. In this example, the indication 182 is a graphical indication comprising a button prompt, generated by the user interaction indication generating unit 105/205, indicating that the player may press a particular button or key on an input device (such as input device 103 illustrated in FIG. 3) to initiate the coupling.

More generally, the user interaction indication generating unit 105/205 may be configured to generate an indication that the player may provide user input to initiate coupling of the emotional or physical state of the player character 184 to the emotional or physical state of another character (e.g. NPC 183).

In scene 181, the player has pressed the button indicated by the button prompt 182, and as a result the emotional state of the player character 184 has become coupled to that of the NPC 183, as indicated by arrow F. Therefore, the player character 184 has become angry, mirroring the emotional state of the NPC 183.

Figure 20:
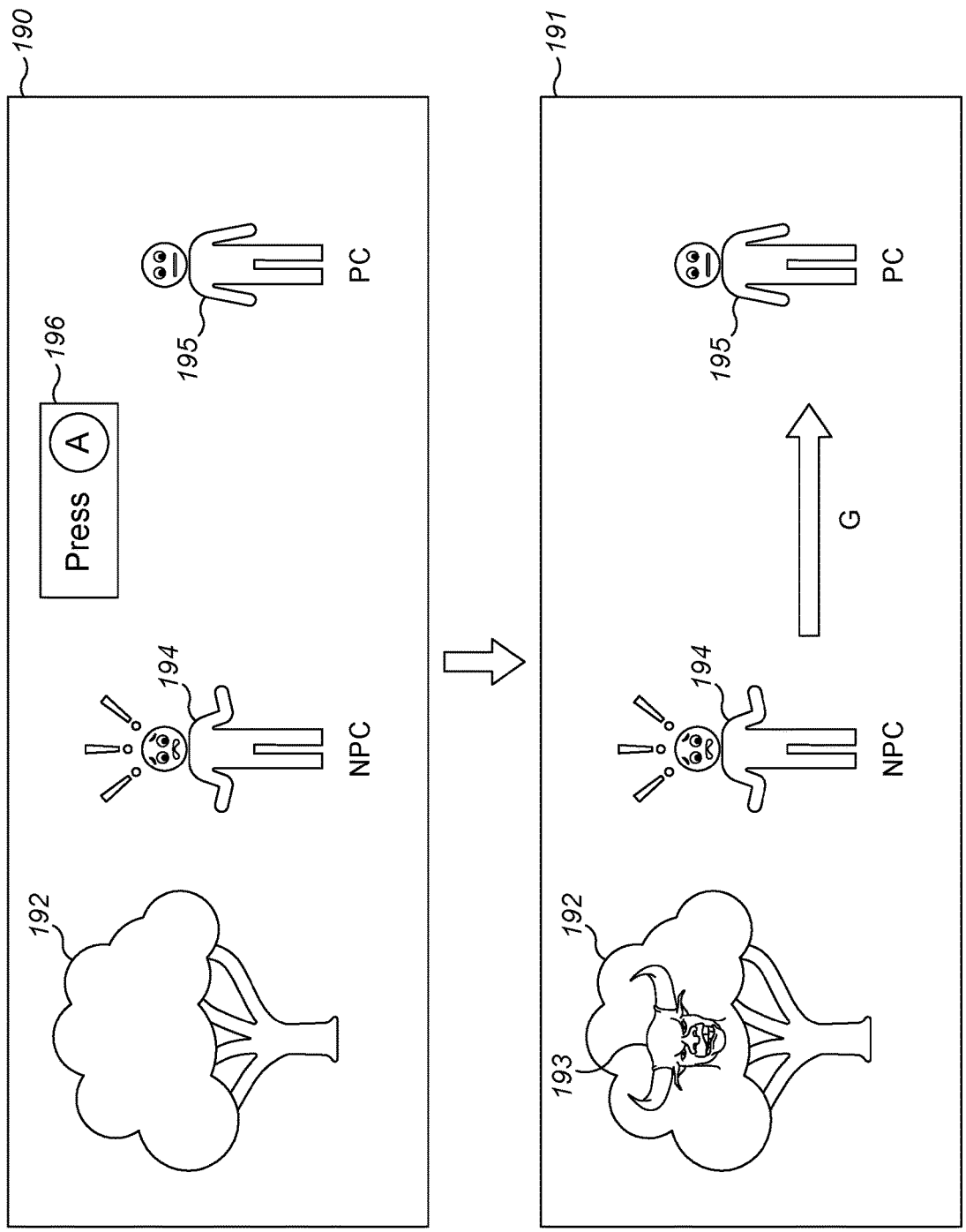
FIG. 20 depicts a first schematic screenshot showing a scared non-player character, a player character, a tree and an indication that a player may couple the player character to the non-player character, and a second schematic screenshot in which the non-player and player characters are coupled and the tree has been correspondingly modified.

FIG. 20 depicts a variant of the situation illustrated in FIGS. 9 and 10, and shows two sequential scenes 190, 191 of a virtual game world comprising an NPC 194 and player character 195. The NPC 194 has an expression indicating that the NPC 183 is scared.

In scene 190, an indication 196 that the player may provide user input to couple the player character 195 to the NPC 194 in order to generate an indication of an entity 193 perceived by the NPC 194 is also shown. In this example, the indication 196 is a graphical indication comprising a button prompt, generated by the user interaction indication generating unit 105/205, indicating that the player may press a particular button or key on an input device (such as input device 103 illustrated in FIG. 3) to initiate the coupling.

In scene 191, the player has pressed the button indicated by the button prompt 196, and as a result the player character 195 has become coupled to the NPC 194, as indicated by arrow F, and the indication of an entity 193 perceived by the NPC 194 has been generated by the perception indication unit 117/217. In the example shown in FIG. 20, the entity perceived by the NPC 194 is the monster 193 in the tree 192.

In the cases of FIGS. 19 and 20, the indication that the player may provide user input to couple the player character to the NPC is by means of a visual (on-screen) button prompt (e.g. 182 and 196). However, in alternative embodiments the indication may take the form of a sound.

Behavioural Coupling

Figure 21:
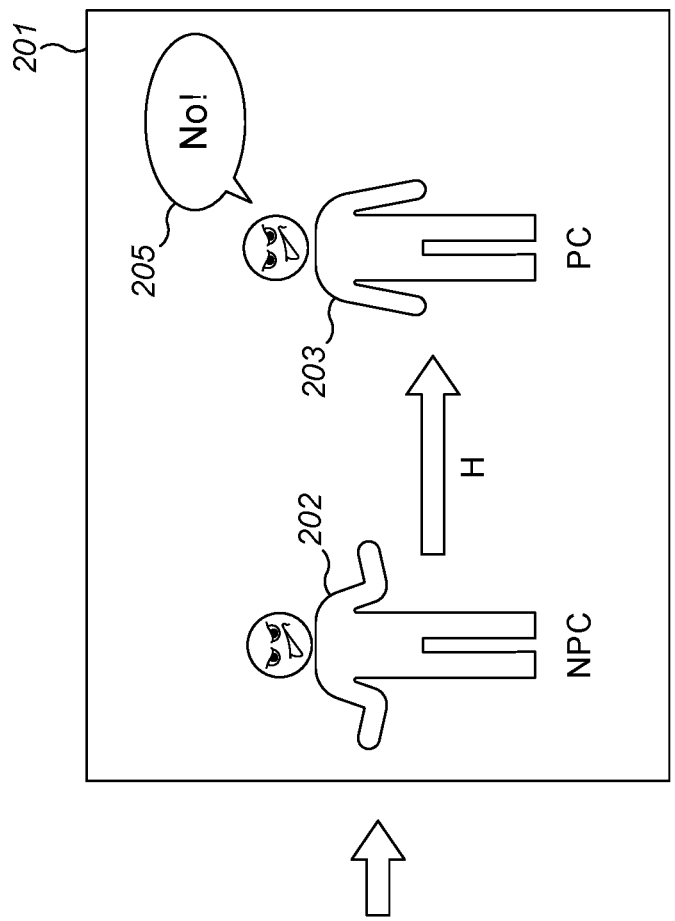
FIG. 21 depicts a first schematic screenshot showing an angry non-player character speaking a line of dialogue and a player character, and a second schematic screenshot in which the player character is coupled to the non-player character and speaks the line of dialogue.
Figure 21:
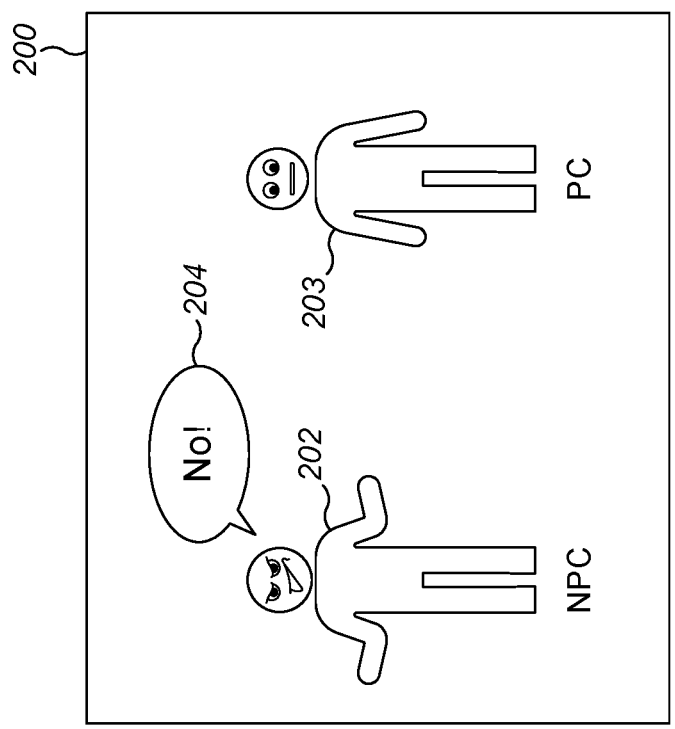

FIG. 21 shows a further example of a coupling of an emotional state of a player character 203 to an emotional state of an NPC 202. In FIG. 21, two sequential scenes 200, 201 of a virtual game world comprising an NPC 202 and a player character 203 are shown. In scene 200, the NPC 202 is experiencing an emotional state of anger, and is speaking a line of dialogue 204. The emotional state of the NPC 202 may be reflected in the voice acting provided for the line of dialogue 204.

In scene 201, the emotional state of the player character 203 has become coupled to the emotional state of the NPC 202. As a result, the player character 203 has become angry, mirroring the emotional state of the NPC 202. Moreover, in this example, the coupling also causes the player character 203 to mirror the speech of the NPC 204. Therefore, the player character 203 speaks a line of dialogue 205 based on the line of dialogue 204 spoken by the NPC 202. For example, the player character 203 may speak exactly the same line of dialogue spoken by the NPC 202. The voice actor for the player character 203 may deliver the line of dialogue in substantially the same manner as that of the NPC 204.

Figure 22:
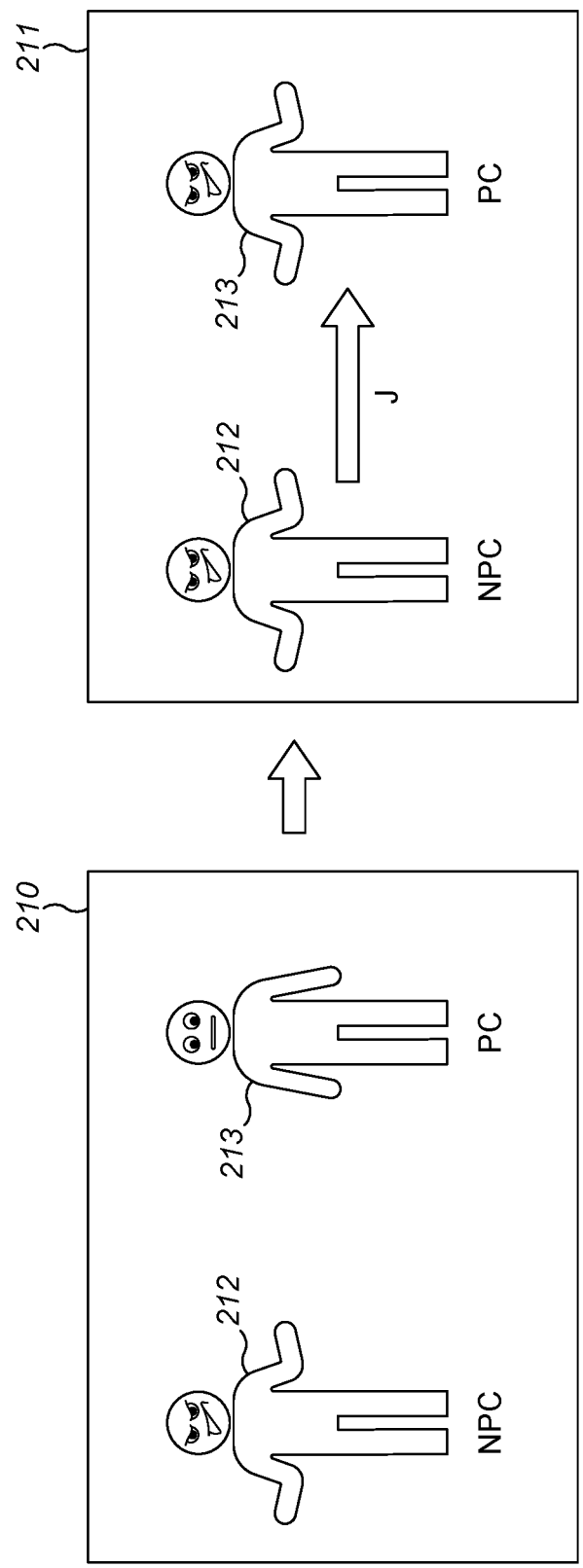
FIG. 22 depicts a first schematic screenshot showing an angry non-player character performing a gesture and a player character, and a second schematic screenshot in which the player character is coupled to the non-player character and performs the gesture.

FIG. 22 shows an example of a coupling between an action performed by an NPC 212 and an action performed by a player character 213. In FIG. 22, two sequential scenes 210, 211 of a virtual game world comprising an NPC 212 and a player character 213 are shown. In scene 210, the NPC 212 is experiencing an emotional state of anger, and is gesturing in an angry manner. For example, the NPC 212 may be angrily shaking his or her fist.

In scene 211 the emotional state of the player character 213 has become coupled to the emotional state of the NPC 212. As a result, the player character 213 has become angry, mirroring the emotional state of the NPC 212. Moreover, in this example, the coupling also causes the player character 213 to mirror an action performed by the NPC 212. Therefore, the player character 213 performs the angry gesture made by the NPC 212. For example, when the player character 213 is coupled to the NPC 212, and the NPC 212 angrily waves a fist, the player character 213 also angrily waves a fist. The player may experience a total or partial loss of control over the player character 213 due to the coupling between the actions of the NPC 212 and the player character 213.

Interactive Coupling

Figure 23:
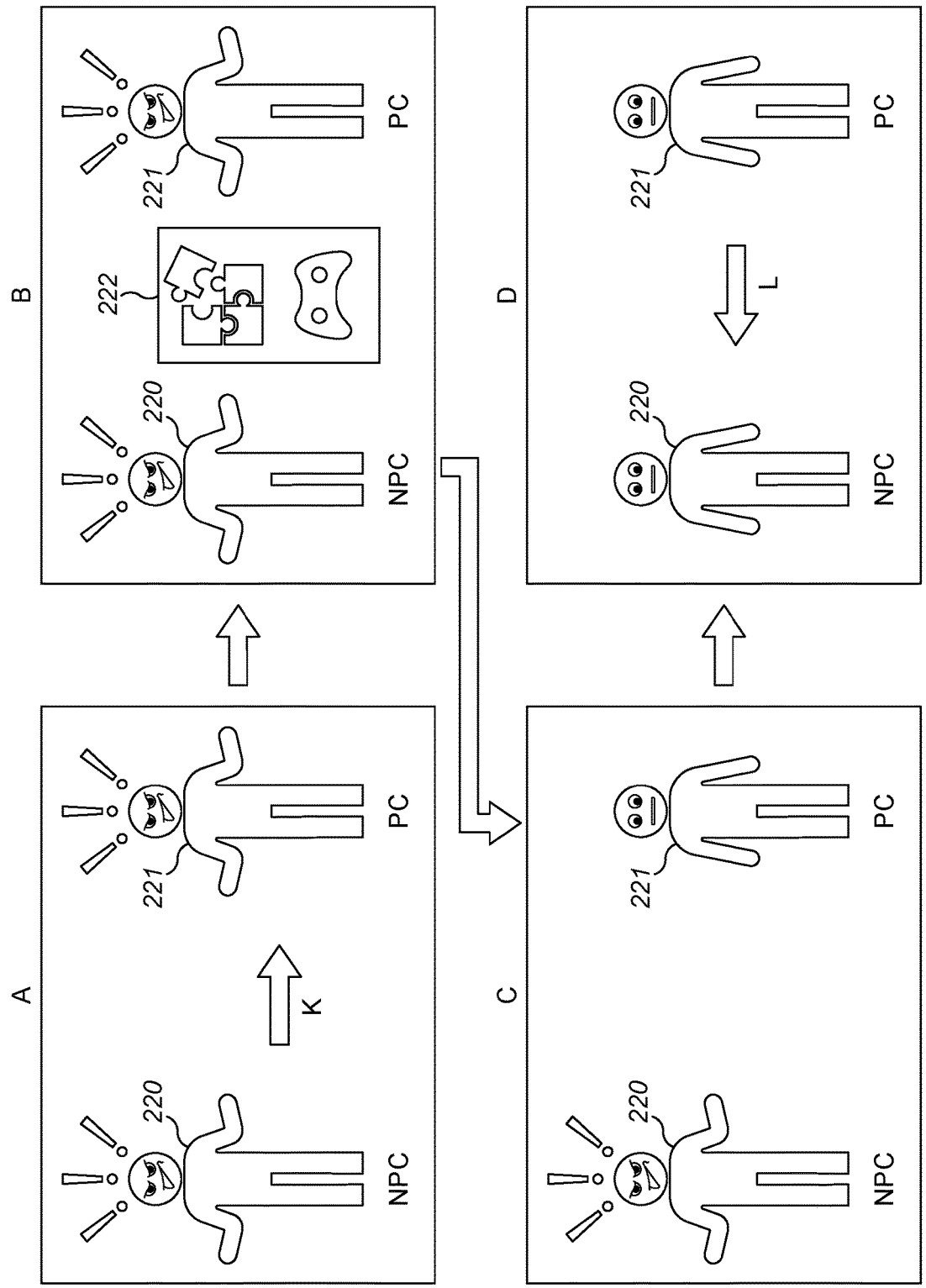
FIG. 23 depicts a series of schematic screenshots showing a player character and a non-player character, in which a minigame is presented to the player, and by interacting with the minigame the player is able to modify the emotional state of the non-player character.

FIG. 23 shows (by means of four consecutive panels, A to D) an example of an interactive minigame with which the player may interact to modify the emotional or physical state of an NPC.

In panel A, an NPC 220 and a player character 221 are shown. The NPC 220 is experiencing an emotional state of anger, and the emotional state of the NPC 220 is coupled to the emotional state of the player character 221 as indicated by the arrow K.

In panel B, an interactive minigame 222 is shown. In one example, the minigame may be a puzzle or skill-based game.

By interacting with the minigame, the player is able to influence the emotional state of either the player character 221 or the NPC 220. In this example, the player is able to influence the emotional state of the player character 221 by interacting with the minigame. Since the emotional state of the player character 221 is coupled to that of the NPC 220, the change in the emotional state of the player character 221 caused by the player will then be reflected in the emotional state of the NPC 220.

In other variants, the player's interaction with the minigame may directly influence the emotional state of the NPC 220, irrespective of any effect on the emotional state of the player character 221.

The minigame may be played with the NPC 220 as a co-player or opponent (but not necessarily so). For instance, the minigame may be a game that the NPC 220 gains pleasure from playing, or which has nostalgic significance for the NPC 220, and thus playing the minigame has the effect of altering the emotional state of the NPC 220.

In panel C, the player has successfully completed the minigame 22 and so the player character 221 has become less angry. As a result, as shown in panel D, the NPC 220 becomes less angry due to the coupling of the emotional state of the player character to the emotional state of the NPC 220.

In another example, the minigame may simply comprise a selection of one of a number of dialogue options. For example, the NPC 220 may speak a line of dialogue, and the player may select a dialogue option for the player character 221 to speak in reply. Each of the dialogue options may result in a particularly positive or negative effect on the emotional state of the player character 221 or the NPC 220, and in one example the player may be required to deduce which of the dialogue options will have the most positive effect based on the story of the video game.

Coupling of Physical States

The above described embodiments and examples have been described mainly by reference to an emotional state of the player character or the NPC. However, it should be appreciated that instead of coupling or indicating the emotional states of the player character and an NPC, the physical state of the characters may instead be indicated or coupled. The user interaction indication generating unit 105/205 may therefore be configured to generate an indication that the player may provide user input to initiate coupling of the physical state of the player character to the physical state of the NPC.

For example, with reference to FIG. 5, adult NPC 51 may be experiencing a physical state such as pain, or may be experiencing a visual or cognitive impairment. When the player character 52 is inside the boundary 2 indicating the predetermined threshold distance, as shown in FIG. 6, the physical state of the adult NPC 51 may couple to the physical state of the player character 52. For example, when the NPC 51 is experiencing pain, the player character 52 may also experience that pain.

In other examples, when the physical state of the NPC 51 is coupled to the physical state of the player character 52, the control of the player character by the player is affected. In one example the NPC 51 is experiencing a state of drunkenness, the player character 52 also experiences a state of drunkenness, and the player character becomes difficult to control. For example, the video game may simulate random inputs by the player, such that it is difficult for the player to control the player character to move in a straight line.

In another example, the coupling of the physical state of the player character 52 to the physical state of the NPC 51 affects the presentation of the virtual game world to the player. For instance, if the NPC 51 is experiencing visual impairment such as short-sightedness or blindness, the player character 52 may also experience the visual impairment due to the coupling of the physical state of the player character 52 to the physical state of the NPC 51. As a result, the game world presented to the player may become blurred or darkened. Alternatively, if the NPC 51 is experiencing an auditory impairment such as deafness, the player character 52 may also experience the auditory impairment due to the coupling of the physical state of the player character 52 to the physical state of the NPC 51. As a result, the audio (e.g. sounds and music from the virtual game world) played to the player may become distorted or may decrease in volume.

Summary

Figure 24:
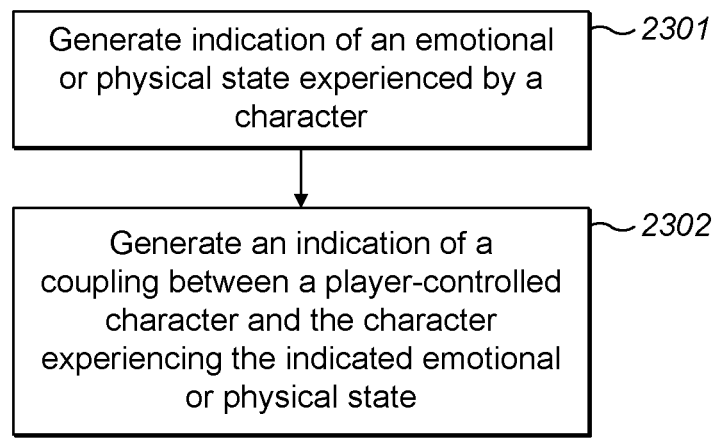
FIG. 24 is a procedural flow diagram of a general coupling routine according to embodiments of the invention, for generating an indication of a coupling between a player-controlled character and a character experiencing an emotional or physical state.

To summarise some of the main concepts from the present disclosure, FIG. 24 shows a procedural flow diagram of a coupling routine for generating an indication of a coupling between a player-controlled character and a character experiencing an emotional or physical state.

In step 2301, an indication of an emotional or physical state experienced by a character is generated.

In step 2302, an indication of a coupling occurring between a player-controlled character and the character experiencing the indicated emotional state is generated.

Modifications and Alternatives

Detailed embodiments and some possible alternatives have been described above. As those skilled in the art will appreciate, a number of modifications and further alternatives can be made to the above embodiments whilst still benefiting from the inventions embodied therein. It will therefore be understood that the invention is not limited to the described embodiments and encompasses modifications apparent to those skilled in the art lying within the scope of the claims appended hereto.

For example, in the above described embodiments and examples a coupling between a player character and another character has been described—e.g. the coupling of the emotional state of the player character to the emotional state of another character, or the coupling of the player character to another character to generate an indication of an entity perceived by the other character. It will be appreciated that these couplings may simply represent the natural empathy of the player character. Alternatively, the coupling could represent a supernatural ability of the player character to perceive or experience the emotions, thoughts and perceptions of other characters.

From the above, it will be appreciated that an emotional or physical state of a character, such as the emotional state of anger experienced by the non-player character 51 in FIGS. 5 and 6, may be indicated (by a state indication generated by the state indicator generating unit 113/213) in the virtual game world simply by the facial expression of the character. Alternatively, the emotional state of a character may be indicated by another type of state indication, such as (but not limited to) one of the graphical indications illustrated in FIGS. 15a to 15d. In one example, the state indication may be generated when the player character is closer than a predetermined threshold distance in the virtual game world to the other character. This predetermined threshold distance may be the same as, or different from, the predetermined threshold distance illustrated in FIGS. 5 and 6, and may be used to determine whether the emotional or physical state of the player character is to be coupled to the emotional or physical state of the other character.

In the above described embodiments and examples the player character has been described as interacting with an NPC. However, the player character may alternatively interact in a similar manner with a character controlled by another human player. For example, the player may be provided with an indication of an emotional or physical state of the character controlled by the other player. In one example, each player may select one of a number of emotional or physical states to be assigned to their corresponding player character, and such emotional or physical states may then be shared with the player character of the other player by means of a coupling process as described herein.

The invention claimed is:

1. A non-transitory computer-readable recording medium storing instructions thereon, wherein the instructions when executed by one or more processors cause the one or more processors to:

provide a video game comprising a virtual game world presented to a player of the video game, and a plurality of characters in the virtual game world including a first character that is not controlled by the player, and a second character controlled by the player;

generate, for display, a state indication indicating an emotional or physical state of the first character; and generate, for display, a coupling indication indicating a coupling occurring between the emotional or physical state of the first character and an emotional or physical state of the second character when the second character is closer than a first predetermined threshold distance in the virtual game world from the first character;

wherein the instructions cause the one or more processors to generate the state indication when the second character is closer than a second predetermined threshold distance in the virtual game world from the first character; and wherein the instructions cause the one or more processors to generate a first graphical indication of the first predetermined threshold distance in the virtual game world, a second graphical indication of the second predetermined threshold distance in the virtual game world, or both the first graphical indication and the second graphical indication.

2. A non-transitory computer-readable recording medium storing instructions thereon, wherein the instructions when executed by one or more processors cause the one or more processors to:

provide a video game comprising a virtual game world presented to a player of the video game, and a plurality of characters in the virtual game world including a first character that is not controlled by the player, and a second character controlled by the player;

generate, for display, a state indication indicating an emotional or physical state of the first character; and generate, for display, a coupling indication indicating a coupling occurring between the emotional or physical state of the first character and an emotional or physical state of the second character;

wherein the state indication comprises a graphical indication in the form of a visible aura that at least partially surrounds the first character; and wherein the visible aura increases in size or intensity as a distance between the first character and the second character decreases.

3. A non-transitory computer-readable recording medium storing instructions thereon, wherein the instructions when executed by one or more processors cause the one or more processors to:

provide a video game comprising a virtual game world presented to a player of the video game, and a plurality of characters in the virtual game world including a first character that is not controlled by the player, and a second character controlled by the player;

generate, for display, a state indication indicating an emotional or physical state of the first character; and generate, for display, a coupling indication indicating a coupling occurring between the emotional or physical state of the first character and an emotional or physical state of the second character;

wherein the state indication comprises a graphical indication in the form of a visible aura that at least partially surrounds the first character, and a corresponding graphical indication in the form of a visible aura that at least partially surrounds the second character; and wherein one or both of the visible auras increases in size or intensity as a distance between the first character and the second character decreases.

4. A non-transitory computer-readable recording medium storing instructions thereon, wherein the instructions when executed by one or more processors cause the one or more processors to:

provide a video game comprising a virtual game world presented to a player of the video game, and a plurality of characters in the virtual game world including a first character, and a second character controlled by the player;

generate, for display, a state indication indicating an emotional or physical state of the first character;

couple the emotional or physical state of the second character to the emotional or physical state of the first character when the second character is closer than a first predetermined threshold distance in the virtual game world from the first character;

generate, for display, a coupling indication indicating the coupling between the emotional or physical state of the first character and the emotional or physical state of the second character when the second character is closer than a second predetermined threshold distance in the virtual game world from the first character; and generate a graphical indication of the first predetermined threshold distance or the second predetermined threshold distance in the virtual game world.

5. A non-transitory computer-readable recording medium storing instructions thereon, wherein the instructions when executed by one or more processors cause the one or more processors to:

provide a video game comprising a virtual game world presented to a player of the video game, and a plurality of characters in the virtual game world including a first character, and a second character controlled by the player;

generate, for display, a state indication indicating an emotional or physical state of the first character, the state indication comprising a first visible aura that at least partially surrounds the first character and increases in size or intensity as a distance between the first character and the second character decreases;

couple the emotional or physical state of the second character to the emotional or physical state of the first character when the second character is closer than a first predetermined threshold distance in the virtual game world from the first character; and generate, for display, a coupling indication indicating the coupling between the emotional or physical state of the first character and the emotional or physical state of the second character.

6. The non-transitory computer-readable recording medium according to claim 5, wherein the coupling indication comprises a second visible aura that at least partially surrounds the second character and increases in size or intensity as the distance between the first character and the second character decreases.

* * * * *